United States Patent [19]

Nakayama et al.

[11] Patent Number: 5,505,794
[45] Date of Patent: Apr. 9, 1996

[54] METHOD FOR HEAT TREATING METALLIC MATERIALS AND APPARATUS THEREFOR

[75] Inventors: Ryoji Nakayama; Takuo Takeshita; Shouichi Kubo, all of Omiya, Japan

[73] Assignee: Mitsubishi Materials Corporation, Tokyo, Japan

[21] Appl. No.: 246,076

[22] Filed: May 19, 1994

Related U.S. Application Data

[62] Division of Ser. No. 981,223, Nov. 25, 1992, Pat. No. 5,354,040.

[30] Foreign Application Priority Data

| Nov. 28, 1991 | [JP] | Japan | 3-339840 |
| Dec. 19, 1991 | [JP] | Japan | 3-337315 |
| Dec. 27, 1991 | [JP] | Japan | 3-347443 |
| Dec. 27, 1991 | [JP] | Japan | 3-347444 |
| Jan. 13, 1992 | [JP] | Japan | 4-4227 |
| Jan. 30, 1992 | [JP] | Japan | 4-15578 |

[51] Int. Cl.$^6$ .................................................. H01M 8/22
[52] U.S. Cl. .......................... 148/508; 148/511; 148/709; 420/900; 429/59
[58] Field of Search .......................... 420/900; 148/709, 148/508, 511; 429/59, 101

[56] References Cited

U.S. PATENT DOCUMENTS

| 4,215,008 | 7/1980 | Hagiwara et al. | 420/900 |
| 4,216,274 | 8/1980 | Bruning et al. | 429/101 |
| 4,360,505 | 11/1982 | Sheridan, III et al. | 420/900 |
| 4,490,348 | 12/1984 | Mizuno et al. | 420/900 |
| 4,537,761 | 8/1985 | Reed et al. | 420/900 |
| 4,565,686 | 1/1986 | Kumar | 420/900 |
| 4,769,225 | 9/1988 | Reilly et al. | 420/900 |
| 5,043,233 | 8/1991 | Kameoka et al. | 429/101 |
| 5,082,754 | 1/1992 | Jones | 429/101 |
| 5,447,582 | 9/1995 | Bylon et al. | 420/900 |

FOREIGN PATENT DOCUMENTS

| 1295203 | 12/1986 | Japan . |
| 02279501 | 11/1990 | Japan . |

*Primary Examiner*—George Wyszomierski
*Attorney, Agent, or Firm*—Oblon, Spivak, McClelland, Maier & Neustadt

[57] ABSTRACT

The present invention presents a method and an apparatus for heat treating a metallic material by performing hydrogen absorption in or desorption from the metallic material. The method includes the steps of recovering the hydrogen gas released from a desorption step and recycling it to a hydrogen absorbing step. Hydrogen recovering can be performed either in a device containing a hydrogen absorbing alloy or in a second heat treating furnace containing the metallic material. Various controlling devices are used to regulate the process of heat treating and recovering of hydrogen gas.

6 Claims, 14 Drawing Sheets

METHOD FOR HEAT TREATING METALLIC MATERIALS AND APPARATUS THEREFOR

This is a division of application Ser. No. 07/981,223, filed on Nov. 25, 1992, now U.S. Pat. No. 5,354,040.

BACKGROUND OF THE INVENTION

The present invention relates to a method for heat treating a metallic material and an apparatus therefor, in particular to a method and an apparatus for altering the microstructure of the metallic material by absorbing hydrogen in the metallic material and releasing the hydrogen from the hydrogenated metallic material so as to adjust their physical properties or pulverize the material.

Conventionally, a method for adjusting the physical properties of metallic materials (for example, improvement in the magnetic properties of rare earth (R)-Fe-B alloys by grain refining, or improvement in fatigue and creep resistance of Ti-based alloys by grain coarsening), is to apply an absorption/desorption cycle of hydrogen at a certain temperature. An apparatus, shown in FIG. 1, for performing such an operation has been examined in the past.

The heat treating apparatus 101 comprises: a heat treating furnace 102 for receiving a metallic material W and heating the metallic material W to a specific temperature; a hydrogen cylinder 104 connected to the furnace 102 via a gas supply path 103 for storing the hydrogen gas; an exhausting means 105 connected to the furnace 102 for exhausting the gaseous atmosphere from inside the furnace 102; an exhaust gas treatment means 106 for combusting the exhausted gas and discharging the combusted gas out of the apparatus.

In the above heat treating apparatus 101, the process comprises the steps of: charging the metallic material W into the furnace 102 and evacuating the furnace; absorbing hydrogen in the metallic material W by supplying hydrogen into the furnace 102 from the hydrogen cylinder 104 and holding the metallic material in the furnace 102 at an elevated temperature between 500° to 1000° C.; reducing the pressure inside the furnace 102 while holding the temperature of the furnace 102 at the above-noted temperature, thereby releasing the hydrogen from the metallic material W.

The apparatus is set up so that the hydrogen released from the metallic material W is withdrawn by the exhausting means 105, and, after being combusted by the subsequent exhaust gas treatment means 106, is expelled out of the apparatus.

In the above-described conventional method, there is a problem that the hydrogen for use in treating the metallic material W is consumed by being expelled out of the apparatus, therefore fresh hydrogen must be supplied for each treatment, resulting in a need to supply a huge quantity of hydrogen, and further resulting in a need for a hydrogen cylinder 104 of a large storage capacity.

As a counter measure for the problem, a consideration may be given to returning the hydrogen exhausted from the furnace 102 back into the hydrogen cylinder 104, for example.

However, even for this type of method, it is necessary to provide a liquefaction facility to convert the gasified hydrogen back to the liquid state, which requires a large sized processing facility, thus leading to a high cost of constructing a treatment facility. Therefore, recycling of hydrogen as described in the above manner is not an effective solution to the problem of the existing technology. This difficulty is made worse in the case of a multiple heat treating facility, because a hydrogen supply system must be provided for each heat treating furnace.

Further, a possibility can be considered that in using the recycled hydrogen gas, impurities which may have become included in the gas could affect the properties of the material being processed with the recycled gas.

SUMMARY OF THE INVENTION

It is therefore an object of the present invention to provide a heat treating method for heat treating a metallic material by which the above mentioned problems in the existing technology can be effectively overcome.

Another object of the present invention is to provide an apparatus adapted to practice such effective heat treating of the metallic material.

According to a first aspect of the present invention, there is provided a method for heat treating a metallic material, comprising the steps of effecting hydrogenation of causing the metallic material to absorb hydrogen and dehydrogenation of releasing the absorbed hydrogen from the metallic material; and recovering the hydrogen by retrieving the released hydrogen and returning the same to the hydrogenation and dehydrogenation step.

In the above recovery step, the hydrogen can be stored by absorption into or released by desorption from a hydrogen absorbing alloy, or hydrogen can be generated from the hydrogenation and dehydrogenation steps in the heat treating furnace. The processes of hydrogenation and dehydrogenation may be repeatedly performed to recover the hydrogen.

In the above heat treating process, because the volumes of hydrogen exchanged in the hydrogenation and dehydrogenation steps are about the same, the recovered volume of hydrogen is about the same as the volume of hydrogen necessary for the next cycle of heat treating, therefore, there is no need to supply fresh hydrogen. If some is lost through handling losses, it is only necessary to supply a small volume to make up the loss.

According to a second aspect of the present invention, there is provided an apparatus for heat treating a metallic material, comprising a heat treating furnace for effecting hydrogenation of causing the metallic material to absorb hydrogen and dehydrogenation of releasing the absorbed hydrogen from the metallic material; and means attached to the heat treating furnace for recovering the hydrogen by retrieving the released hydrogen and returning the same to the heat treating furnace.

The above noted hydrogen recovery means can be comprised of a hydrogen storing means including a hydrogen absorbing alloy, or comprised of a second heat treating means for performing hydrogenation to causes-the metallic material to absorb the hydrogen and dehydrogenation of the metallic material to release the hydrogen.

As the hydrogen storing means including the hydrogen absorbing alloy, a known device as disclosed, for example, in Japanese Patent Application Laid-Open No. 55-126198 or U.S. Pat. No. 4,270,360, may be employed. The device, for example, comprises a closed vessel, a pair of parallel porous plates fixedly housed in the vessel so as to be spaced from each other, heating/cooling portions each disposed outside the porous plates so as to be spaced from a respective porous plate, and a hydrogen absorbing alloy filled into the space between a respective porous plate and a respective heating/ cooling portion. In this device, the hydrogen stored in the hydrogen absorbing alloy is released or stored again by heating or cooling the heating/cooling portion.

There are a number of variations to the basic apparatus as presented above. First, various sensors can be provided to the apparatus which produce signals representative of the interior pressures and temperatures of the heat treating furnace and the hydrogen storing means. A master controlling means may also be provided for regulating the supplying and withdrawing of the hydrogen atmosphere, depending on the operating status of the heat treating means, in accordance with the signals supplied by the sensors.

In such an apparatus, when the hydrogenation step is being performed in the heat treating furnace, the interior temperature of the hydrogen storing means is maintained at a specific temperature, and the interior pressure therein is reduced to a specific pressure, by the temperature and pressure controlling means controlled by the master controller. At the same time, the interior temperature of the heat treating furnace is maintained at a specific temperature and the interior pressure therein is increased to a specific pressure, by the same controller. With this control, the hydrogen released from the metallic material in the heat treating furnace is delivered to the hydrogen storing means, and hydrogen absorption takes place. And, the hydrogen thus desorbed from the hydrogen storing means is delivered to the heat treating means for the next hydrogenation cycle.

On the other hand, when the heat treating furnace is performing the dehydrogenation step, the interior temperature of the heat treating furnace is maintained at a specific temperature and the interior pressure therein is reduced to a specific pressure. The interior temperature of the hydrogen storing means is maintained at a specific temperature and the interior pressure therein is reduced to a specific pressure, by the regulating actions of the master controller on the temperature controlling means and pressure controlling means. The metallic material in the heat treating furnace releases hydrogen while the hydrogen absorbing alloy in the hydrogen storing means absorbs hydrogen. When the hydrogen released from the metallic material is delivered to the hydrogen storing means, the hydrogen is recovered by being absorbed in the hydrogen absorbing alloy. By repeating the above mentioned steps, the hydrogen is circulated between the hydrogen storing means and the heat treating furnace.

Further, in the above apparatus, it is possible to arrange evacuation means, for withdrawing the released hydrogen from the heat treating furnace and delivering it to the hydrogen storing means, in the exhaust path for delivering the released hydrogen from the heat treating means to the hydrogen storing means. Pressure adjustment means is also provided for adjusting the pressure of the released hydrogen for delivery to the heat treating furnace, in the supply path for supplying hydrogen from the storing means to the heat treating furnace. Such an arrangement enables the master controller to adjust the actions of the evacuation means and thereby supplying and withdrawing of hydrogen to the heat treating furnace depending on the status of the heat treating furnace.

Further, it is possible to provide a plurality of heat treating furnaces, each of which is connected with the hydrogen storing means, together with a plurality of connecting paths including switching means, for selectively connecting the hydrogen storing means to one of the plurality of connecting paths.

In such an apparatus system also, the heat treating is performed in the same way as in the above described sequence, but when processing is completed in one heat treating furnace and the released hydrogen is stored in the hydrogen storing means, the switching means connects the hydrogen storing means to the other heat treating furnace, and in accordance with the previous descriptions, the hydrogen is supplied to the other heat treating furnace, and the hydrogenation step is performed in the other heat treating furnace.

By such sharing of one hydrogen storing means among a plurality of heat treating furnaces, the apparatus is able to supply hydrogen to a plurality of heat treating furnaces, thus enabling to operate a plurality of heat treating furnaces in parallel.

Further, in such a system having a plurality of heat treating furnaces, it is possible to supply and withdraw hydrogen with evacuation means for withdrawing the hydrogen from each heat treating furnace and delivering it to the hydrogen storing means in the exhaust path, and also providing pressure adjustment means for adjusting the pressure of the hydrogen to be supplied to each of the plurality of heat treating furnaces, and thereby controlling the actions of the heat treating furnaces and the evacuation means, by means of the master controller controlling the interior pressures and temperatures in accordance with the signals provided by various sensors provided thereon.

In the apparatus provided with the evacuation means, it is possible to provide hydrogen refining means in the exhaust side of the evacuation means. In such a modification, accompanying the action of the evacuation means, the released hydrogen from the heat treating furnace is delivered to the hydrogen storing means via the hydrogen refining means. Therefore, when the released hydrogen passes through the hydrogen refining means, impurity particles contained therein are removed, thereby preventing possible adverse effect of impurity particles on the metallic material.

Further, in the case of construction of the hydrogen recovering means employing the second heat treating furnace, it is possible to provide pressure adjusting means for increasing the interior pressures of the heat treating furnace for hydrogenation while simultaneously supplying hydrogen thereto, and for decreasing the interior pressure of the heat treating furnace for dehydrogenation while simultaneously withdrawing hydrogen therefrom.

In such an apparatus, when one heat treating furnace is performing the hydrogenation step, the interior temperature of one furnace is raised to a specific temperature, and the hydrogen is supplied thereto by means of the hydrogen pressure adjustment means, and the interior pressure therein is raised to a specific pressure, and the hydrogenation step is performed therein. When the hydrogenation step is completed in the one heat treating furnace, the atmosphere therein is withdrawn so as to release hydrogen, and the released hydrogen is withdrawn by means of the pressure adjustment means, leading to lowering in the interior pressure of the one heat treating furnace, thereby performing the dehydrogenation step in the one heat treating furnace.

In the meantime, while the one heat treating furnace is releasing hydrogen, the other heat treating furnace connected to the one heat treating furnace is being prepared for operation by raising the interior temperature to a specific temperature, and when the processing in the one furnace is completed or in parallel, the pressure adjustment means delivers the hydrogen withdrawn from the one heat treating furnace to the other heat treating furnace. Accordingly, filling of the interior of the other heat treating furnace and the rise in the interior pressure take place leading to the hydrogenation step in the other heat treating furnace.

As summarized above, the hydrogen used for heat treating the metallic material is cycled between the hydrogen storing means and the heat treating furnace, and the leakage of the hydrogen to the outside environment is restricted. Further, the volume of hydrogen for one heat treating furnace is sufficient for serving the needs of at least more than two heat treating furnaces, leading to lowering of the hydrogen consumption and preventing the facility from becoming large.

In the above case also, it is possible to provide hydrogen refining means in the path for connecting the plurality of heat treating furnaces. By such an arrangement, it becomes possible to purify the hydrogen being delivered from one heat treating furnace to the other heat treating furnace, thereby delivering cleaned hydrogen for every processing.

DESCRIPTION OF PREFERRED EMBODIMENTS OF THE INVENTION

The heat treating method and the apparatus therefor of the present invention will be explained with reference to the figures.

Figure 1:
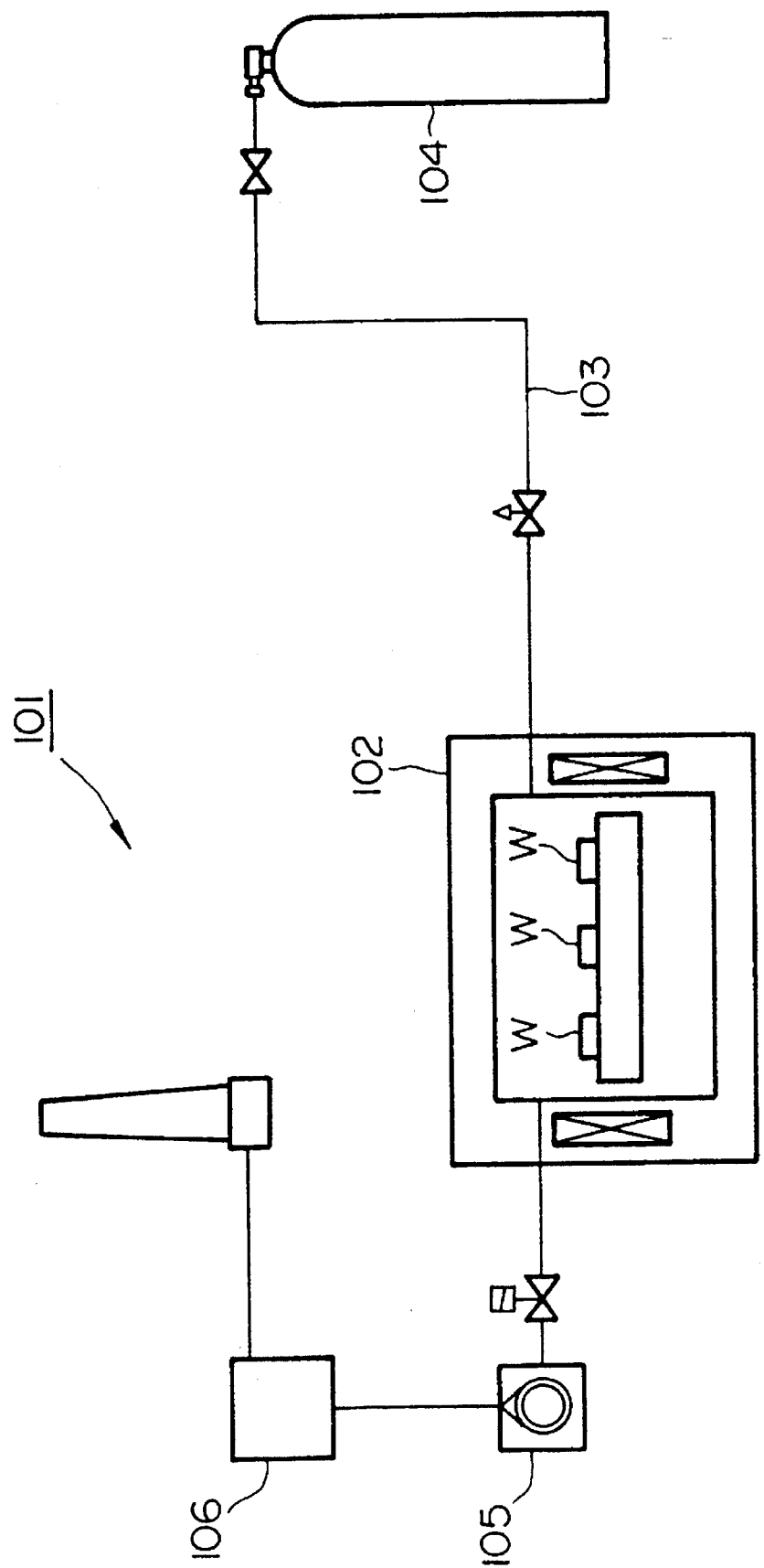
FIG. 1 is a schematic drawing of a conventional heat treating apparatus for metallic materials.
Figure 2:
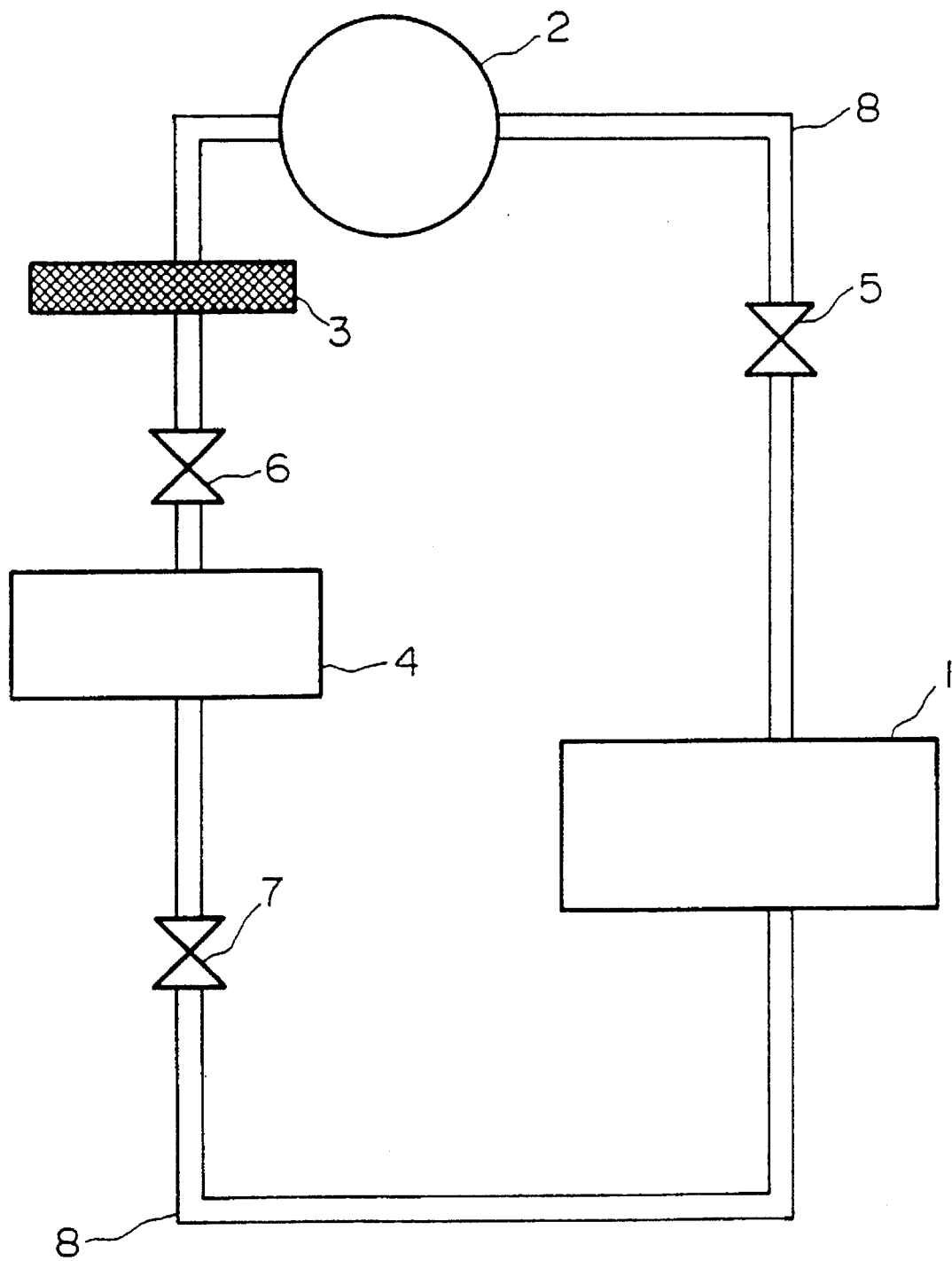
FIG. 2 is a schematic diagram for explaining a first embodiment of the heat treating apparatus of the present invention.

FIG. 2 represents a conceptual framework of the present invention in terms of a schematic illustration of a first embodiment. In this figure, the reference numeral 1 indicates a heat treating furnace (referred to as the furnace 1) for hydrogenation/dehydrogenation treatment; 2 is an evacuation means; 3 is a filter; 4 is a storage device including a hydrogen absorbing alloy; 5, 6 and 7 are flow valves; and 8 is a connecting path. The flow valves 5, 6, and 7 are for preventing back flow of the released hydrogen gas as well as for adjusting the pressure and flow rate of the hydrogen gas.

Figure 3:
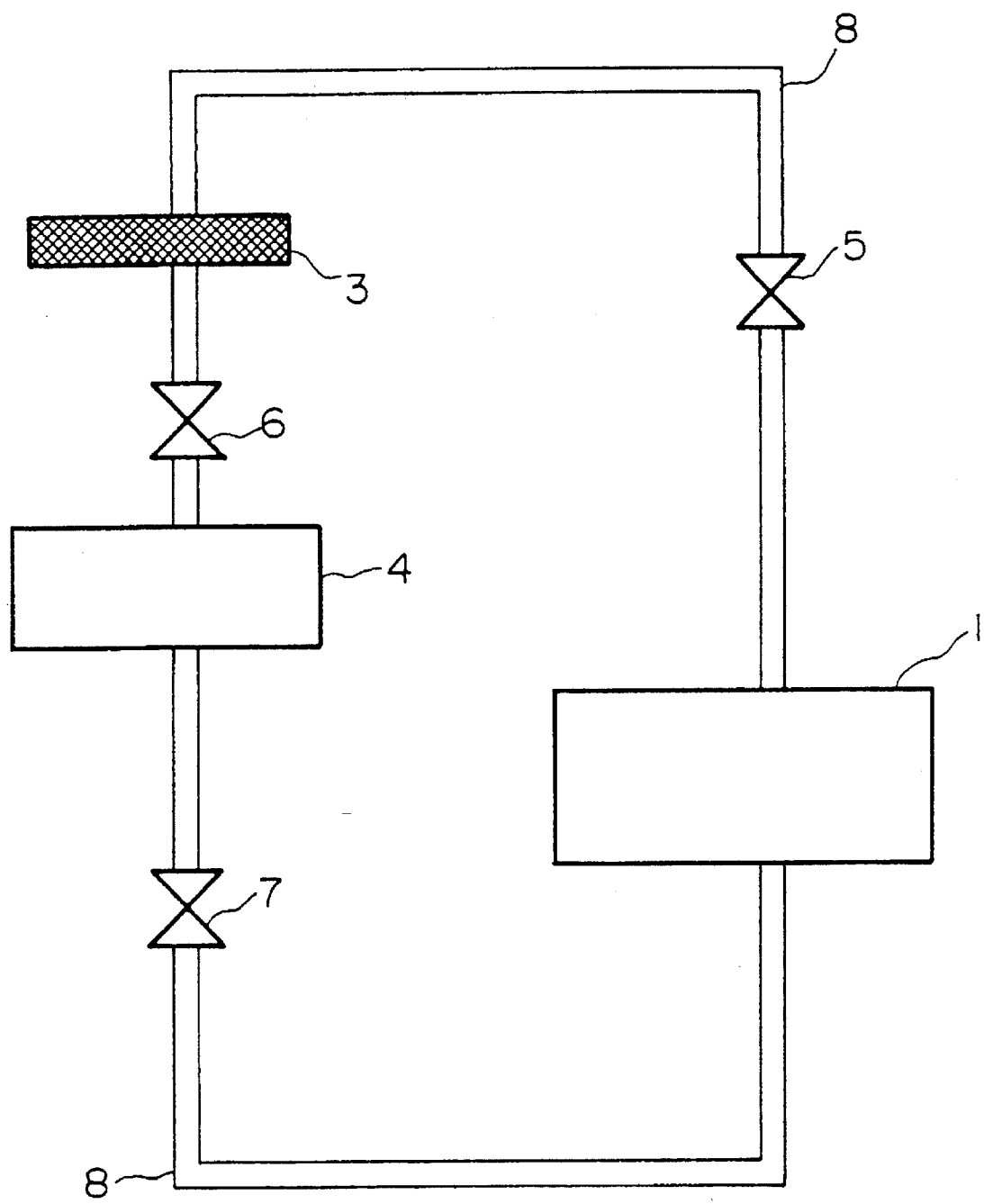
FIG. 3 is a schematic diagram illustrating a variation of the embodiment shown in FIG. 2.

The evacuation means 2 can be eliminated depending on the nature of the material to be processed and such a system is shown in FIG. 3. In this figure, the reference numerals refer to the same components as in FIG. 2, and the flow valves 5, 6 and 7 serve the same purpose. When the evacuation means is eliminated as in this case, dehydrogenation of the material subjected to hydrogenation in the furnace 1 is performed by utilizing the differential absorption capacity between the metallic material being treated in the furnace and the hydrogen absorbing alloy in the storage device 4. In other words, when the hydrogen absorption capacity of the storage device 4 is higher than the hydrogen absorption capacity of the material, the pressure in the furnace 1 can be lowered by the hydrogen absorption action of the storage device 4, thus providing dehydrogenation of the material in the furnace 1.

In referring to FIGS. 2 and 3, by discharging the hydrogen gas from the storage device 4, which is being fully pressurized by the hydrogen gas, and simultaneously opening the flow valve 7, the hydrogen gas is supplied to the furnace 1, thereby performing the hydrogenation step; next by performing dehydrogenation in the same furnace 1, thereby generating released hydrogen and returning the released hydrogen through the connecting path 8 either by the evacuation means 2 to the storage device 4 or by direct absorption into the storage device 4.

The recycled released hydrogen atmosphere thus generated in the dehydrogenation process contains a minute amount of impurity gases, such as oxygen and water vapor, including particulate matters, but they can be eliminated by passing the released gas through the filter 3, and the released gas is returned to the storage device 4. It is necessary that the absorbing alloy in the storage device 4 have sufficient absorbing capacity for absorbing the released hydrogen gas.

In contrast to the conventional systems which consume a huge quantity of hydrogen, the systems illustrated above do not emit the released hydrogen gas to the environment, thus enabling the effective conservation of hydrogen. When hydrogen is consumed in certain situations in the invented system, it is only necessary that the consumed amount of hydrogen be replenished as necessary. As described above, the systems illustrated in the present invention provide advantages of effective utilization of the hydrogen gas, high safety and ease of operation.

Further, the present invention is clearly applicable not only to hydrogenation of alloy materials but also to a variety of other processes requiring hydrogen as a processing gas.

In the following, the present embodiment will be illustrated in detail with reference to experimental examples.

EXAMPLE 1

An alloy ingot test material having a composition of 12.5 atomic % Nd, 11.6 atomic % Co, 6.0 atomic % B, 0.1 atomic % Zr, 0.4 atomic % Ga, and the remainder consisting essentially of Fe, was prepared by plasma arc melting and casting. The test material was homogenized at 1130° C. for 20 hours in an atmosphere of argon.

In the meantime, a system was arranged by connecting the furnace 1, evacuation means 2, filter 3, and the storage device 4 through flow valves 5, 6 and 7 with connecting path 8, and a hydrogenation process was carried out by placing the homogenized test material in the furnace 1, supplying hydrogen from the hydrogen storage alloy (referred to as the alloy) heated at 70° C. in the storage device 4 so as to generate a hydrogen pressure of 1 atm in the furnace 1. The homogenized test material maintained at this pressure condition was heated from room temperature to 830° C. and held at this temperature for three hours to carry out hydrogenation.

While maintaining the temperature at 830° C., the flow valve 5 is opened while simultaneously shutting off the hydrogen supply, to carry out dehydrogenation by withdrawing the hydrogen in the furnace 1 by means of the evacuation means 2 to a pressure of $1 \times 10^{-1}$ torr. The released hydrogen gas was filtered through the filter 3 to remove particulate matters, supplied to the storage device 4 and hydrogen was stored by cooling the alloy (which was held at 70° C.) to 10° C.

The furnace 1 used in this example was comprised of a vacuum tube furnace with externally wound Kanthal wire heater, and the hydrogen storage device 4 comprised a device containing an alloy of a composition $LaNi_{4.7}Al_{0.3}$ having a hydrogen storage capacity of 15 $Nm^3$.

The hydrogen gas restored in the storage device 4 was a recycled gas which was generated by heating the alloy to 70° C. and reused for hydrogenation of the material in furnace 1. This hydrogen recycling was repeated ten times, but the volume of hydrogen gas lost was only 0.05 $Nm^3$.

Conventional Example 1

Hydrogen cylinders (not shown) were used as the supply source for hydrogen gas, which were connected with the furnace 1, and the hydrogenation/dehydrogenation cycle was repeated ten times under the same conditions of heat and pressure as in the Example 1. The volume of hydrogen gas lost was 56.6 $Nm^3$. As demonstrated in this comparative testing, in the example 1, there is hardly any hydrogen lost while in the conventional example 1, a large quantity of hydrogen gas is consumed.

EXAMPLE 2

From a powder test material of Ti-6%Al-4%V .(in weight %) having an average particle size of 120 μm, test parts of a prescribed geometrical shape were produced by hot isostatic pressing at 750° C. and 2000 atm for three hours.

A vacuum box furnace having an internal graphite heater was used as the furnace 1, and a storage device 4 contained a hydrogen storage alloy of $(La_{0.9}Mm_{0.1})Ni_{4.5}Al_{0.5}$ (where Mm represents rare earth elements such as La, Ce, Pr, Nd) having a hydrogen storage capacity of 15 $Nm^3$. Other conditions were the same as in Example 1.

Hydrogenation was carried out by placing the Ti-alloy test parts in the furnace 1, supplying hydrogen obtained by heating the hydrogen storage alloy to 80° C. in the storage device 4 so as to generate a hydrogen pressure of 1 atm in the furnace 1. The test parts were heated to 850° C., and maintained at this temperature for one hour to convert the microstructure to single β phase by hydrogenation. Next, by operating the evacuation means 2, the pressure inside the furnace 1 was lowered to below $1 \times 10^{-4}$ torr to convert the microstructure to α + β phase by dehydrogenation.

The hydrogen gas exhausted by the evacuating device 2 was returned to the storage device 4 after passing through the filter 3 for removing the particulate matters, and by cooling the alloy to 10° C., the hydrogen gas was stored in the storage device 4. This recycling was repeated twenty times, but the amount of gas lost was 0.1 $Nm^3$.

Conventional Example 2

The hydrogen supply was made from hydrogen cylinders (not shown), and was piped into the furnace 1. The tests were carried out in the same way as the Experimental Example 2 for twenty times, and the lost gas volume was 26.6 $Nm^3$. As demonstrated, there is hardly any loss of gas in the Experimental Example 2, but the conventional example consumes a large volume of the gas.

EXAMPLE 3

The test material used was ZrCo alloy. The furnace 1 was a vacuum box furnace with an external high purity silicon carbide heater, the storage device 4 contained an alloy of $(La_{0.7}Mm_{0.3})Ni_{3.2}Co_{0.5}Mn_{0.7}Al_{0.6}$ (where Mm represents rare earth elements such as La, Ce, Pr, Nd) having a hydrogen storage capacity of 15 $Nm^3$. In this test, the evacuation means was omitted, and an apparatus of FIG. 3, in which the flow valve 5 and the filter 3 were connected via the path 8, was employed.

The hydrogen gas was generated by heating the alloy in the storage device 4 to 200°, and supplied to the furnace 1 to maintain a hydrogen pressure of 6 atm. The test material of ZrCo alloy placed in the furnace 1 was heated to 150° C., and maintained at this temperature and pressure for 0.5 hour to carry out hydrogenation. Next, the temperature was lowered to 30° C. and the test material held at this temperature for two hours to carry out hydrogenation-induced pulverizing.

Next, the temperature of the ZrCo test material was raised to 200° C. to release hydrogen gas, and the pressure inside the furnace 1 was lowered to $1 \times 10^{-1}$ torr, by utilizing the pressure differential between the storage device 4 and the test material, to carry out dehydrogenation. In this case, dehydrogenation process was made possible by the large hydrogen pressure differential which was created as a result of the higher absorbing capacity of the alloy in the storage device 4 drawing off the hydrogen gas from the ZrCo test material held at 200° C. in the furnace 1.

The hydrogen gas released from the ZrCo test material in the furnace 1 was passed through the filter 3 for removal of particulate matters, and was returned to the storage device 4, and stored in the storage device 4 by cooling the alloy (from 70° C.) to 10° C. After twenty recycling tests, the lost amount of hydrogen was 0.2 $Nm^3$.

Conventional Example 3

The hydrogen supply was made from hydrogen cylinders (not shown), and was delivered into the furnace 1. The tests were carried out in the same way as the Example 3 for twenty times, and the lost gas volume was 31.5 $Nm^3$. As demonstrated, there is hardly any loss of gas in the Example 2, but the conventional example consumes a large volume of the gas.

In the following, the heat treating apparatus of the present invention will be further explained with reference to various embodiments.

Figure 4:
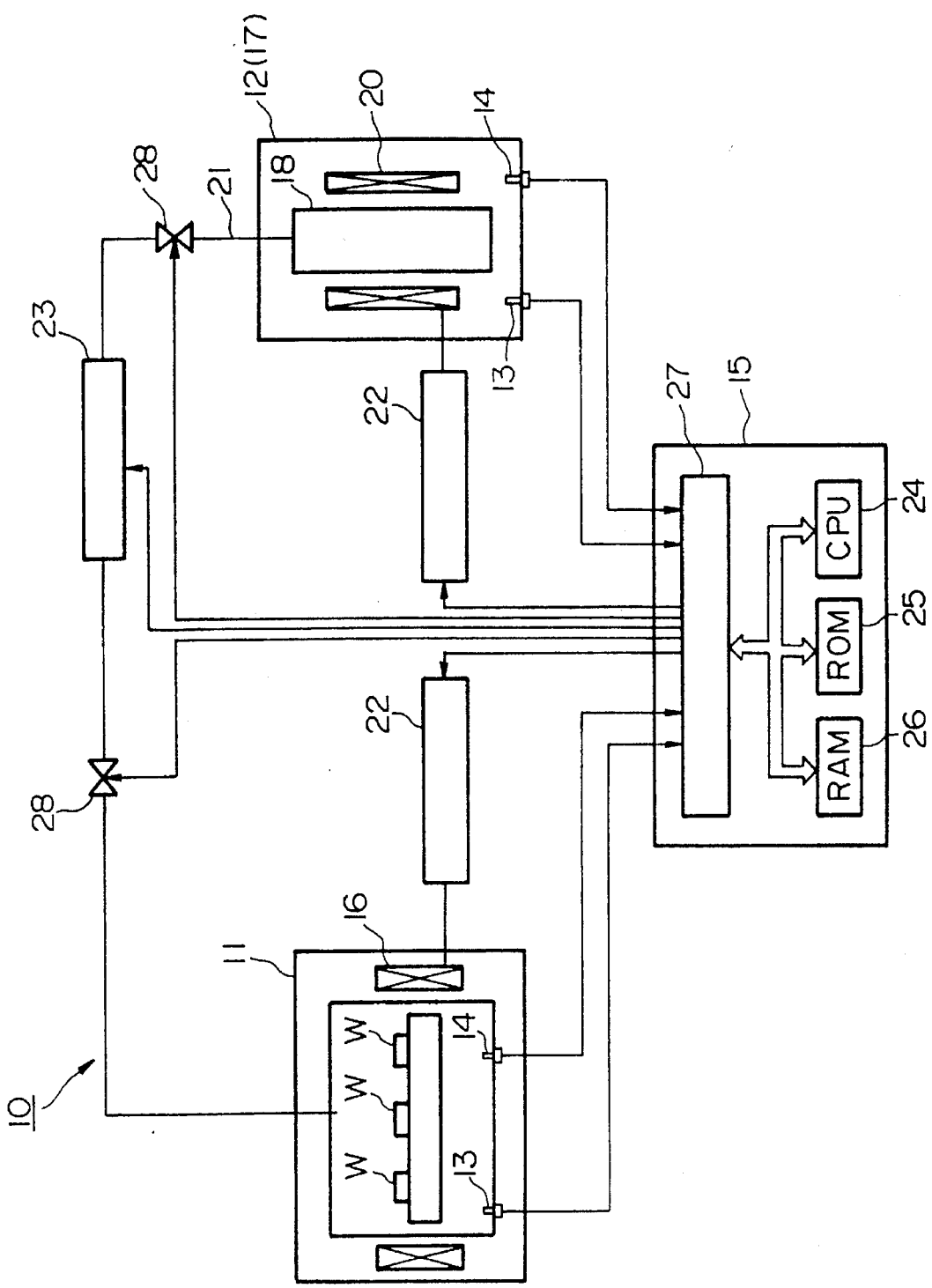
FIG. 4 is a schematic diagram for a second embodiment of the heat treating apparatus of the invention.
Figure 5:
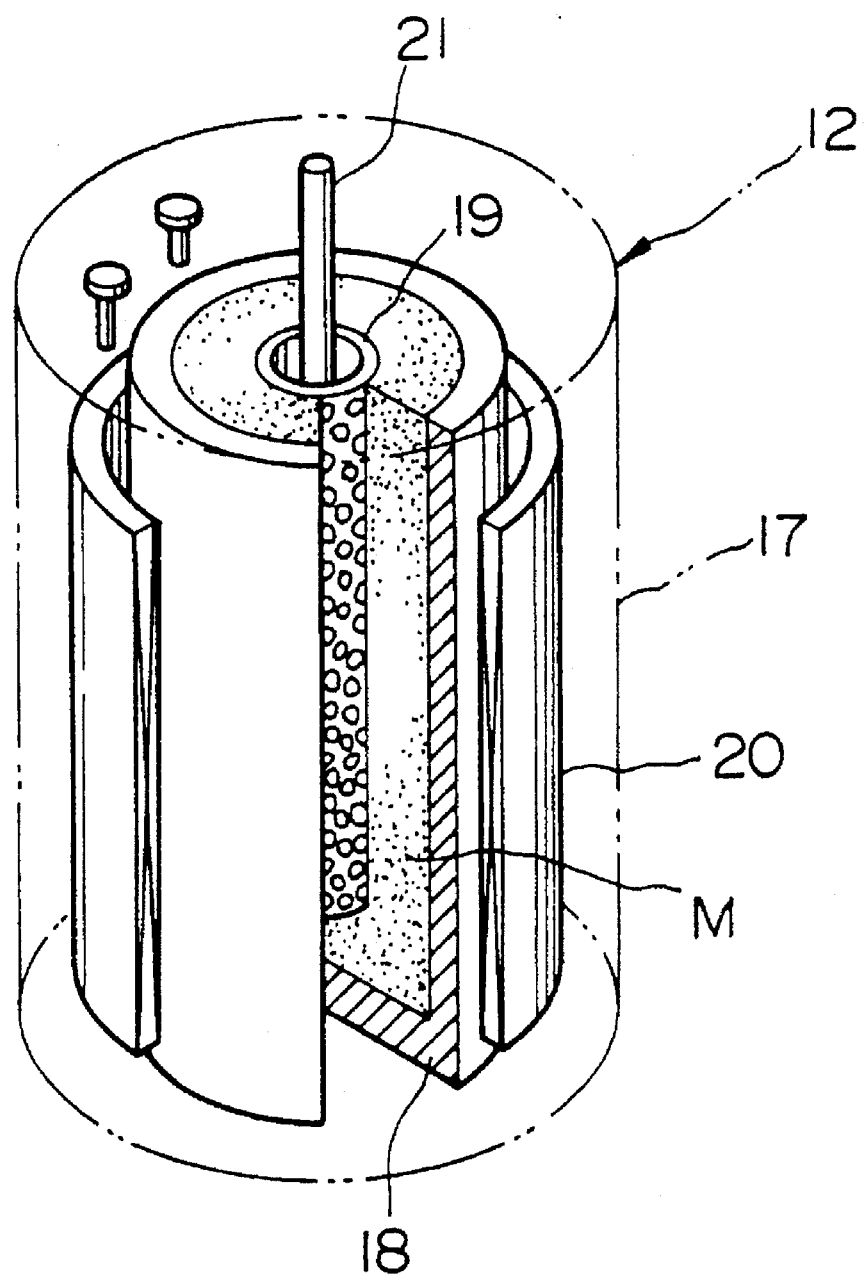
FIG. 5 is a perspective view showing the interior structure of a hydrogen storing device for the apparatus shown in FIG. 4.

FIGS. 4 and 5 show an apparatus 10 of a second embodiment for processing metallic materials W. The apparatus 10 comprises: a heat treating furnace 11 for hydrogenation of metallic materials W and for dehydrogenation of the same; a hydrogen storage device 12 including a hydrogen absorbing alloy M for storing the hydrogen gas to be supplied to the furnace 11; a pressure sensor 13 and a temperature sensor 14 provided on each of the furnace 11 and the storage device 12 for measuring the pressure and temperature therein; and a master controlling means or master controller 15 for controlling the pressures and temperature inside the furnace 11 and the storage device 12, in accordance with the output signals from the sensors 13 and 14 so as to supply or withdraw hydrogen gas from the furnace 11 in accordance with the processing status of the furnace 11.

The furnace 11 can be any type of vacuum containers provided with an internal heater 16 of graphite, tungsten, or molybdenum, or vacuum containers provided with an external heater 16 of Kanthal or high purity silicon carbide. In the present embodiment, an externally heated type furnace 11 is shown.

The internal or external heating furnace 11 is chosen depending on the type of metallic materials W to be processed.

As shown in FIG. 5, the hydrogen storage device 12 comprises: a pressure container 17 forming an external shell; a heat-transfer vessel 18, made of a good thermal conductive material, disposed inside the pressure container 17 so as to be spaced from the internal peripheral surface of the pressure container 17; a support tube 19 formed of a porous body and disposed in the center of the vessel 18; a hydrogen absorbing alloy M filling the space between the support tube 19 and the vessel 18; and a heater 20 surrounding the vessel 18.

The alloy M can be any of R-Ni (R being a rare earth group element) based alloys, Ti-Fe-Mn based alloys or Ti-Mn based alloys which provide high speed of absorption and desorption of hydrogen gas at around room temperature.

Further, as shown in FIG. 4 or FIG. 5, on the wall section of the container 17 is disposed a connecting pipe 21 which extends through the wall of the container 17 and is placed in the inside of the support tube 19. A pressure sensor 13 and a temperature sensor 14 which measure the pressure and the temperature, respectively, of the regions surrounding the alloy M are also provided on the wall section of the container 17.

Further, a temperature controlling means 22 is connected to the heater 20 to control the temperature of the inside of the container 17 by controlling the amount of current supplied to the heater 20.

Further, the opposite end of the connecting pipe 21 inserted into the container 17 is connected to the furnace 11 so as to communicate the storage device 12 and the furnace 11, and a pressure controlling means or pressure controller 23 for controlling the pressures of the storage device 12 and the furnace 11 is disposed on the pipe 21.

The pressure controller 23 is constructed of a device, such as a fluid-operated cylinder, to enable internal volume changes of the components connected therewith, but not permit exchanging of the gases in the storage device 12 and the furnace 11 with the gases outside of the apparatus 10, and is operated by the above mentioned master controller 15. By connecting with the furnace 11 or with the container 17 selectively, the volume of a component connected to the pressure controller 23 can either be increased or decreased. When the volume is increased, the pressure therein drops and hydrogen is released. When the volume is decreased, the pressure therein increases, thus enabling absorption to take place. The transfer of hydrogen takes place from a component at a high hydrogen pressure to a component at a lower hydrogen pressure.

The furnace 11 is provided with a temperature controlling means 22, similar to that on the storage device 12, each of which is connected to the master controlling means 15, and controls the current to the heater 16 or 20 in accordance with the control signal from the master controller 15.

Referring to FIG. 4, the master controller 15 comprises: a central processing unit (shortened to CPU) 24; read only memories (shortened to ROM) 25 storing operational programs for the CPU 24; random access memories (shortened to RAM) 26 storing control programs for the furnace 11; and an I/O interface 27 which is connected to each of CPU 24, ROM 25 and RAM 26 via buslines and interfaces with each of the pressure sensors 13, the temperature sensors 14, the temperature controlling means 22 and the pressure controller 23.

Disposed on those portions of the connecting pipe 21 sandwiching the aforesaid pressure controller 23 are flow valves 28 which are controlled separately to open or close by means of the master controller 15, thereby selectively connecting the pressure controller 23 with either the furnace 11 or the storage device 12 via the connecting pipe 21.

The metallic materials W to be subjected to heat treating in the present invention include the following materials.

One such material is an R-Fe-B based alloy (R being a rare earth group element) having the following composition:

R : 10–20 atomic %;

B : 3–10 atomic %;

Fe : remainder; and unavoidable impurities:

to which are added the following additives, as necessary,

Co 0.1–50 atomic %;

M 0.001–5.0 atomic %;

where M is at least one of Al, Si, Ga, Ti, V, Cr, Zr, Nb, Mo, Hf, Ta, W, C and N.

Another material is a Ti based alloy, and for example, may have either of the following compositions, all in weight %:

(1) Al:6.5%, Sn:1.4%, Zr:1%, Mo: 2.9%, Cr:2.1%, Fe:1.7%, and the remainder Ti;

(2) Al:6%, V:4%, and the remainder Ti;

(3) Al:6%, Sn:2%, Zr:4%, Mo:2%, and the remainder Ti;

(4) V:10%, Fe:2%, Al:3%, and the remainder Ti;

In addition to treating the above-mentioned materials W, the apparatus can also be used for activating or pulverizing treatment of hydrogen absorbing materials such as R-Ni and Zr-Cr alloys.

In the following, the use of the apparatus of the present embodiment for the treatment of metallic materials is illustrated with reference to Examples 4 and 5.

EXAMPLE 4

The R-Fe-B based alloys, having compositions shown in Table 1, Cases 1–4, were melted in a plasma arc furnace and cast into an ingot which was homogenized at 1130° C. for twenty hours in an argon atmosphere. The metallic material W thus produced exhibited a coarse ferromagnetic phase of approximately 120 μm particle size.

The process was started by placing such a metallic material W in the furnace 11, and evacuating the atmosphere of the furnace 11. The master controller 15 sends a control signal to both temperature controlling means 22, thus heating the furnace 11 and the storage device 12.

The interior temperature of the furnace 11 and the storage device 12 was measured by each temperature sensor 14, and is fed back to the master controller 15. By adjusting the input signal to the temperature controlling means 22 according to the feed back signal, the interior temperatures of the furnace 11 and the storage device 12 were kept at a specific constant temperature of about 830° C. for the furnace 11 and about 70° C. for the storage device 12.

With reference to FIG. 4, when suitable conditions are reached, the signal from the master controller 15 sends a signal to the flow valve 28 on the side of the storage device 12 to open, thereby communicating the storage device 12 to the pressure controller 23.

Next, a signal is sent from the master controller 15 to the pressure controller 23 so as to withdraw the hydrogen gas from the storage device 12, thereby decreasing the pressure inside the container 17 of the storage device 12.

By this step, the hydrogen is desorbed from the alloy M stored in the storage device 12, and the desorbed hydrogen is withdrawn into the pressure controller 23.

Next, the master controller 15 sends a signal to both flow valves 28 so as to close the open flow valve 28 on the side of the storage device 12 and simultaneously open the flow valve 28 on the side of the furnace 11 to communicate the pressure controller 23 with the furnace 11.

At this time, the master controller 15 sends a control signal to the pressure controller 23 so as to charge the hydrogen withdrawn into the pressure controller 23 into the furnace 11, and the hydrogen is charged into the furnace, thereby delivering the hydrogen desorbed from the storage device 12 to the furnace 11, thus increasing the pressure inside the furnace 11.

The interior pressure of the furnace 11 is measured by the pressure sensor 13, and according to the signal fed back into the master controller 15, the amount of opening or closing of the flow valve 28 or the amount of the movement of the pressure controller 23 is adjusted so as to maintain the pressure inside the furnace 11 at about one atmosphere.

When the delivering of the hydrogen is so completed, the interior temperature of the furnace 11 is raised to 830° C. by means of the master controller 15, and the metallic material W is held at this temperature for three hours, and hydrogenation of the metallic material W is carried out.

Next, while maintaining the temperatures of the furnace 11 and the storage device 12 at 830° C. and 10° C., respectively, the master controller 15 sends a signal to the flow valve 28 on the side of the furnace 11 to open while another signal is sent to the pressure controller 23 so as to withdraw the atmosphere from inside the furnace 11.

By this step, the pressure inside the furnace 11 is reduced, and the hydrogen gas adsorbed into the metallic material W is released and is withdrawn into the pressure controller 23, and dehydrogenation of the metallic material W is thus carried out. The interior pressure of the furnace 11 is maintained below $1\times10^{-1}$ torr by the actions of the pressure sensor 13 and the master controller 15.

Next, according to an operational signal from the master controller 15, the flow valve 28 on the side of the furnace 11 is closed while the flow valve 28 on the side of the storage device 12 opens, and the pressure controller 23 is operated so as to charge the hydrogen gas withdrawn by the pressure controller 23 into the container 17 of the storage device 12.

As a result of this step, the hydrogen pressure inside the container 17 is increased, thereby recovering the hydrogen gas by absorption into the alloy M.

It was confirmed that the material having the above noted composition of Nd-Fe-B was pulverized into particles of less than 400 μm, and as well as observing that recrystallized crystals of $Nd_2Fe_{14}B$ of 0.2–0.4 μm size were present inside the particles, it was confirmed that the material exhibited the desired strong magnetic properties.

As presented above, according to the apparatus 10 of the present embodiment, the hydrogen gas used for heat treating the metallic material W is confined between the storage device 12 and the furnace 11, thus the emission of the hydrogen gas to outside of the apparatus 10 is controlled, and the consumption of the hydrogen gas is significantly reduced. Since a large sized facility for treating the process gas is not required, the capital expenditure can be reduced considerably.

Furthermore, since the alloy M used in the storage device 12 has as much as three to four times the storage capacity as a cylinder of hydrogen gas, the apparatus can be further reduced in size even from this viewpoint.

At this time, the results of measuring the loss of hydrogen gas after hydrogenation/dehydrogenation cycles of ten times, starting from the initial volume of 35 $Nm^3$ are reported for each of the metallic material W listed in the left column of Table 2. In the right column of Table 2 are shown comparative results of hydrogen loss incurred by using the conventional heat treating system.

These results demonstrate convincingly that the loss of hydrogen gas is negligible when the apparatus of the present invention is used, and the apparatus provides significantly effective processing performance.

EXAMPLE 5

For the metallic material W, Ti-based alloys were used. The composition of the alloys are as shown in Table 3, Cases 1 and 2, and the average particle size was about 120μm. Test parts of the metallic material W of a defined geometrical shape were produced by hot isostatic forming of the powder materials at 750° C. and 2000 atm for three hours.

The test material W was placed inside a furnace 11 equipped with a graphite heater, and after evacuating the inside atmosphere of the furnace 11, the apparatus 10 was operated by activating the various operating components through the master controller 15 as in the previous example, shown in FIG. 4, thus subjecting the test material to cycling hydrogenation/dehydrogenation heat treatment between 850° C. at one atmosphere and 850° C. at $1\times10^{-4}$ torr, respectively.

By performing such heat treatments, a Ti-based material having coarse crystals of (α + β) phase was obtained. Such materials exhibit excellent creep and high cycle fatigue resistance properties.

In these tests also, since the hydrogen gas used for the heat treatments was contained between the storage device 12 and the furnace 11, the loss of hydrogen to outside of the apparatus was prevented.

The results of measuring the loss of hydrogen gas after hydrogenation/dehydrogenation cycles of twenty times, starting from the initial volume of 35 $Nm^3$ are reported for each of the metallic material W listed in the left column of Table 4. In the right column of Table 4 are shown comparative results of hydrogen loss incurred by using the conventional heat treating system.

These results demonstrate that the loss of hydrogen is reduced significantly, and considerable improvements have been achieved in comparison to the conventional apparatus.

Figure 6:
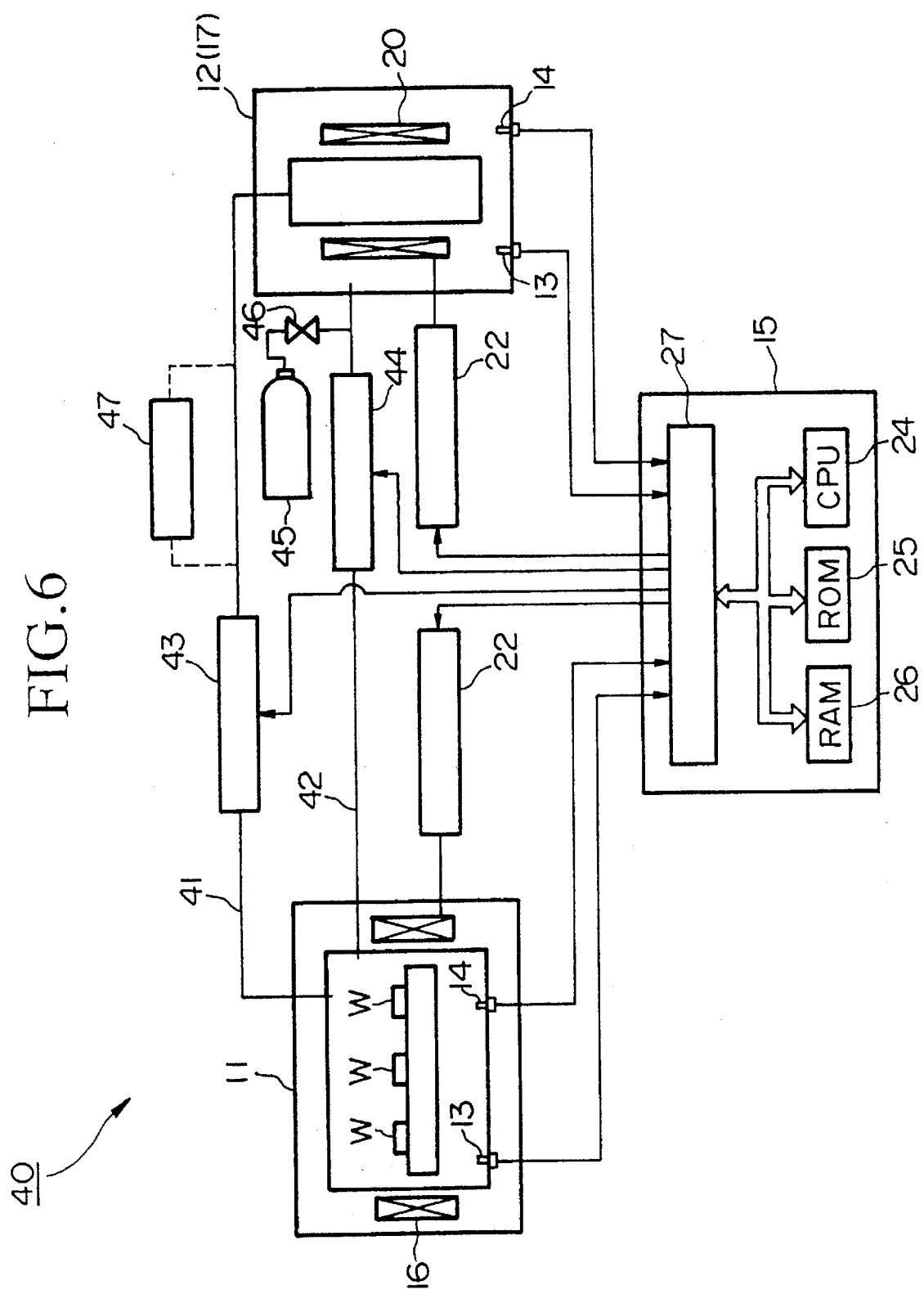
FIG. 6 is a schematic diagram for a third embodiment of the heat treating apparatus for of the invention.

FIG. 6 shows a third embodiment based on a variation of the second embodiment. In the following, the same components are given the same reference numerals, and their explanations are omitted.

The heat treating apparatus 40 of this embodiment comprises: the heat treating furnace 11; the storage device 12 including the hydrogen absorbing alloy M contained therein; an exhaust gas path 41 for delivering the hydrogen gas from the furnace 11 to the storage device 12; a supply path 42 for supplying hydrogen gas from the storage device 12 to the furnace 11; an evacuation means 43 disposed in the exhaust path 41 for withdrawing the atmosphere from the furnace interior and deliver it to the storage device 12; a pressure adjusting means or pressure controller 44 disposed in the supply path 42 for adjusting the pressure of hydrogen being delivered to the furnace 11; the pressure sensor 13 and the temperature sensor 14 provided on each of the furnace 11 and the storage device 12; the master controller 15 which controls hydrogen supply/release from the furnace 11, depending on the status of processing thereof, through controlling the interior pressure and temperature, and the actions of the evacuation means 43 in accordance with the output signals of the pressure and temperature sensors 13 or 14.

The evacuation means 43 is, for example, a vacuum pump having a flow valve in front and rear thereof, and the evacuation side of the pump 43 is connected to the furnace 11 while the exhaust side is connected to the storage device 12, and the exhaust path 41 extending therebetween is maintained gas tight.

The pressure controller 44 is equipped with a flow valve and a pressure reducing valve, and during the normal operation, the supply path 42 is shut off by means of the flow valve thereby shutting off the storage device 12 from the furnace 11. When hydrogen is to be supplied to the furnace 11, the pressure of hydrogen is maintained below one atmosphere by means of the pressure reducing valve.

Further, in this embodiment, a hydrogen cylinder is provided via a flow valve 46 in the supply path 42 between the pressure controller 44 and the storage device 12, and is used for supplying hydrogen gas during the start-up stage or supplementing hydrogen during the loss of hydrogen due to leaks and the like.

The flow valve 46 is connected to the master controller 15 along with the evacuation means 43 and the pressure controller 44, and is controlled by the output signals from the master controller 15.

The metallic material W for processing in the apparatus 40 of the present embodiment is the same as those for the previously described embodiments.

Further in this embodiment, pressurization of the storage device 12 is performed by the evacuation means 43, but it is also possible to arrange, as shown in FIG. 6, a pressurizing means 47 between the evacuation means 43 and the storage device 12, to increase the interior pressure of the storage device 12 even further. This arrangement is useful when it is desired to increase the volume of the hydrogen to be stored in the storage device 12.

Further, the various arrangements of the components, their shapes and the treatment conditions shown in the previous embodiments are only examples, and they are varied depending on the metallic material to be processed and design parameters. For example, in the previous embodiments, hydrogen gas was used as the treatment gas but a mixture with inert gas is also possible in which case the process is controlled by partial pressure of hydrogen.

In the following, experimental processes using the apparatus 40 of the present embodiment will be presented.

EXAMPLE 6

Using the apparatus 40, the metallic material W was placed in the furnace 11 and the apparatus 40 was put into operation. The heaters 16 and 20 were heated by the temperature controller 22 under direction from the master controller 15. The interior temperatures of the furnace 11 and the container 17 inside the storage device 12 were kept constant in accordance with the feedback signals from each of the temperature sensors 14 on the furnace 11 and storage device 12 to the master controller 15.

With reference to FIG. 6, the master controller 15 opens the flow valve of the pressure controller 44, and the hydrogen gas from the storage device 12 is delivered to the furnace 11 while maintaining the pressure at a constant pressure of one atmosphere by means of the pressure reducing valve of the pressure controller 44.

According to the above described process, hydrogen absorption on the metallic material W is carried out in the furnace 11.

After the absorption step is completed, the flow valve of the pressure controller 44 is closed by the master controller 15, and by operating the evacuation means 43, the hydrogen gas inside the furnace 11 is withdrawn into the storage device 12.

The interior pressure of the furnace 11 is thus reduced, and the interior pressure of the storage device 12 is increased, thereby the hydrogen gas is released in the furnace 11 and absorbed in the storage device 12.

The result is dehydrogenation of the metallic material W in the furnace 11 as well as recovery of the released hydrogen gas in the metallic material M in the storage device 12 via the exhaust path 41.

When some hydrogen is lost as a result of repeated hydrogenation/dehydrogenation cycles or opening of the system for inspection, the flow valve 46 is operated to deliver a desired amount of hydrogen to the apparatus from a hydrogen cylinder 45, in this embodiment.

The temperature and pressure conditions in the above presented process are the same as in the previous embodiment, and the resulting properties of the metallic material W subjected to the above process of heat treatment are about the same as obtained in the-previous embodiment.

In this embodiment also, the hydrogen gas used for the process is contained between the storage device 12 and the furnace 11, and only a small amount of hydrogen gas is consumed because there is little loss of hydrogen gas from the apparatus.

Furthermore in this embodiment, the apparatus is arranged so that the hydrogen gas from the furnace 11 is sent directly to the storage device 12, therefore the operation of the apparatus has been simplified by performing lowering of interior pressure of the furnace 11 at the same time as pressurization and charging of the storage device 12.

Further, by providing the pressure controller 44 in the supply path 42, the supply pressure on the hydrogen gas to the furnace 11 from the storage device 12 is controlled more accurately resulting in a more stable operation.

A fourth embodiment of the heat treating apparatus in accordance with the present invention will be explained with reference to FIG. 7. The reference numeral 50 refers to an apparatus for heat treating the metallic material W, and comprises:

(a) a plurality of furnaces 11 (11a–11b), two are shown in this embodiment) each of which performs the operation of hydrogenation/dehydrogenation of the metallic material W;

(b) the hydrogen storage device 12 containing the hydrogen absorbing alloy M for storing hydrogen to be supplied to the furnaces 11 (11a–11b);

(c) a plurality of connecting paths 53 (53a–53b) for hydrogen gas for communicating the furnaces 11 (11a–11b) with the storage device 12;

(d) a switching means 54 (routing valve 54) for connecting one of the plurality of connecting paths 53 (53a–53b) selectively to the storage device 12;

(e) pressure sensors 13 and temperature sensors 14 provided on each of the furnace 11 and the storage device 12;

(f) a master controller 15 which controls supply or release of hydrogen gas to and from the furnace 11, depending on the operational status of the furnace 11, by controlling the interior pressure or temperature of the furnace 11 and the storage device 12 in accordance with the output signals from the pressure sensors 13 or 14.

The explanations for the various components will be omitted as they are mostly the same as in the previous embodiments, excepting that a pressure controlling means or pressure controller 55 is provided in the connecting path 53, for controlling the interior pressures of the storage device 12 and the furnace 11. The pressure controller 55 is connected to the connecting paths 53 (53a–53b) via the routing valves 54 so as to control the flow of hydrogen gas between (the container 17 in) the storage device 12 and the furnace 11, by selectively opening or closing the flow valve 56 in the connecting path 53 through the action of the flow valves 56.

The master controller 15 selectively connects the pressure controller 55 to either the container 17 or the furnaces 11 (11a–11b) so as to enlarge the volume of the connected component to reduce the interior pressure therein, thereby withdrawing the hydrogen gas therefrom, or to decrease the volume of the connected component to increase the pressure therein thereby delivering the hydrogen therefrom. Each of the furnaces 11 (11a–11b) is provided with temperature controllers 22 (22a–22b), as in the case with the storage device 12, and is connected to the master controller 15 which controls the current supply to the heaters 16 and 20.

Examples of using the apparatus 40 of the above described embodiment for heat treating the metallic material W will be presented in the following.

EXAMPLE 7

The metallic materials W having the compositions as shown in Tables 1 to 4 were prepared in the same manner as in Example 4. The metallic material W was placed in the furnace 11a, and the furnace 11a was maintained at about 850° C. and the storage device 12 was maintained at an internal temperature of about 70° C.

Figure 7:
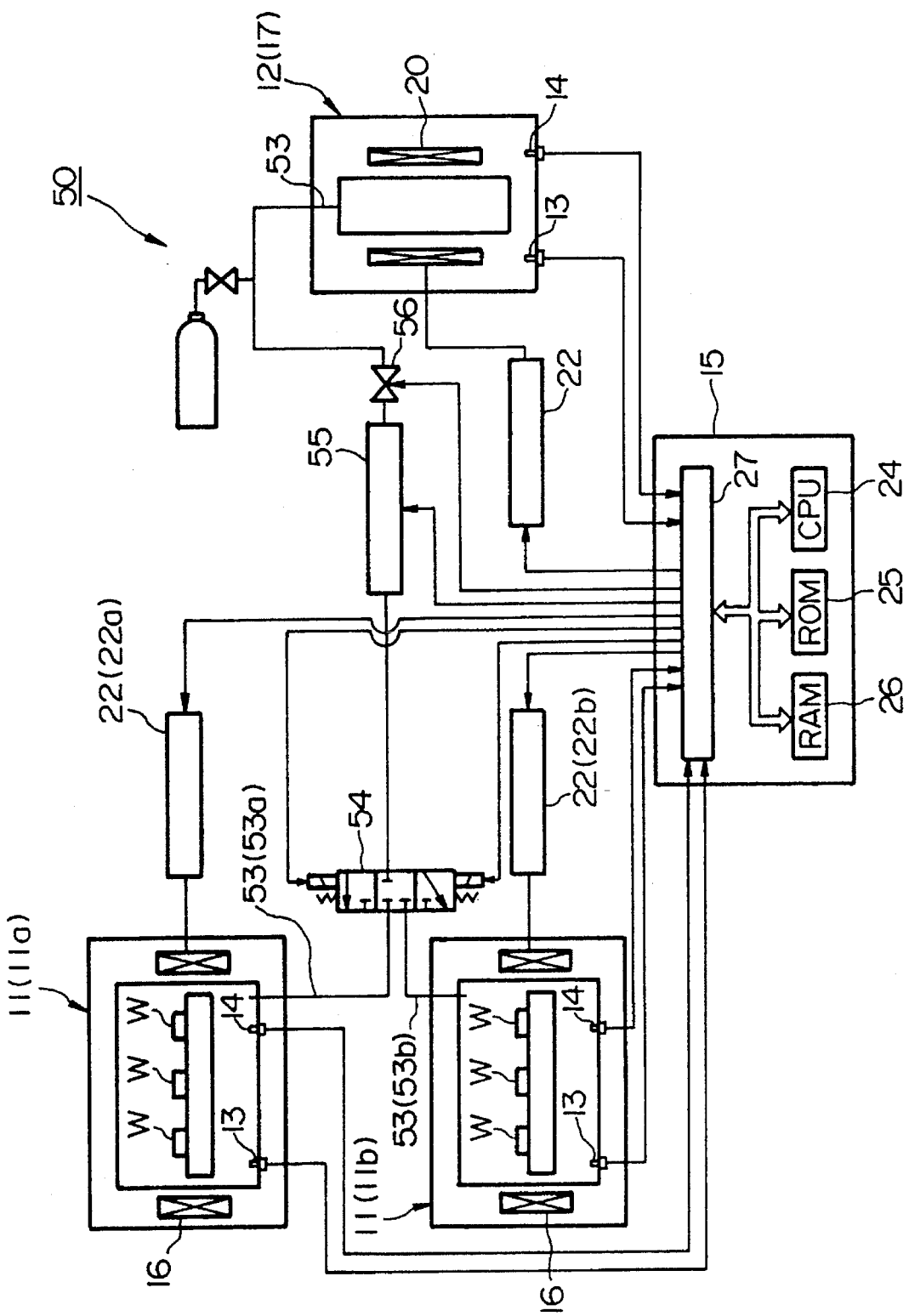
FIG. 7 is a schematic diagram for a fourth embodiment of the heat treating apparatus of the invention.

With reference to FIG. 7, when the master controller 15 opens the flow valve 56, the storage device 12 is connected to the pressure controller 55, while the routing valves 54 is shutting off the connection of the pressure controller 55 to each of the connecting path 53.

Next, the master controller 15 sends a signal to the pressure controller 55 to decrease the internal pressure of the container 17 of the storage device 12. The hydrogen gas is desorbed from the alloy M in the storage device 12 and the released gas is withdrawn into the pressure controller 55. The master controller 15 then sends a signal to the flow valve 56 to close and simultaneously activates the routing valves 54, thereby communicating the pressure controller 55 with the furnace 11a. The master controller 15 then sends a signal to the pressure controller 55 so as to deliver the withdrawn gas to the furnace 11a. The interior pressure of the furnace 11a is increased, and the hydrogen gas withdrawn from the storage device 12 is supplied to the furnace 11a.

The internal pressure of the furnace 11a is measured by the pressure sensor 13 and is fed back to the master controller 15, which controls the amount of movement of the pressure controller 55 in accordance with the feedback signal, so as to maintain the interior pressure of the furnace 11a at about 1 atm.

When this stage of hydrogen supply is completed, the master controller 15 adjusts the interior temperature of the furnace 11a to about 830° C., and hold the metallic material W at this temperature for about three hours to carry out the hydrogenation step.

Next, while keeping the interior temperatures of the furnace 11a at 830° C. and the storage device 12 at 10° C., the master controller 15 activates the pressure controller 55 so as to withdraw the atmosphere of the furnace 11a.

Accordingly, the interior pressure of the furnace 11a is reduced, and the hydrogen adsorbed on the metallic material W is released (dehydrogenation) and withdrawn into the pressure controller 55, thereby carrying out a dehydrogenation step of the metallic material W. At this stage, the interior pressure of the furnace 11a is maintained below about $1 \times 10^{-1}$ torr, by the action of the pressure controller 55 regulated by the master controller 15 in accordance with the output of the pressure sensor 13.

Next, the master controller 15 operates the routing valves 54 and shuts off the connection between the pressure controller 55 and the furnace 11a, and simultaneously, the flow valve 56 is opened. Next, the pressure controller 55 is operated, and the hydrogen gas withdrawn by the pressure controller 55 is delivered to the container 17 of the storage device 12.

In the above step, the interior pressure of the container 17 is increased, and the hydrogen gas is recovered by absorption on the alloy M.

Next, the metallic material W is placed inside the furnace 11b, and the inside atmosphere of the furnace 11b is evacuated by means of an evacuation device (not shown), and while the interior temperature of the furnace 11b is maintained by following the same steps as for the furnace 11a, hydrogen is led in from the storage device 12 by means of the pressure controller 55, and the routing valves 54 is activated, thereby communicating the furnace 11b with the storage device 12.

Next, the pressure controller 55 is activated, and the hydrogen gas inside is delivered to the furnace 11b which carries out the absorption step (hydrogenation) as in the case of the furnace 11a.

While the hydrogen absorption step (hydrogenation) is being conducted in the furnace 11b, the metallic material W which has completed the heat treating process in the furnace 11a is cooled, removed from the furnace and fresh metallic material W to be processed is charged thereinto.

By repeating the above described process, heat treating of the metallic material W is alternately carried out between the two furnaces 11a and 11b.

It is noted that the Nd-Fe-B based alloys after the above described processing are pulverized to particles of less than 400 μm average size, containing recrystallized grains of $Nd_2Fe_{14}B$ of 0.2 to 0.4 μm size, and exhibited the desired magnetic properties.

As presented above, according to the apparatus 50 of the present embodiment, the hydrogen gas used for heat treating the metallic material W is confined between the storage device 12 and the furnaces 11 (11a–11b), thus the emission of the hydrogen gas to outside of the apparatus 50 is controlled, and the consumption of the hydrogen gas is significantly reduced. Since a large sized facility for treating the process gas is not required, the capital expenditure can be reduced considerably.

By staggering the timing of the two heat treating cycles of the two furnaces 11a and 11b, the volume of hydrogen gas sufficient for one furnace is shared alternately between the two furnaces, therefore, even if the number of furnaces 11 is increased, the corresponding increase in the volume of hydrogen required can be kept down thus enabling the facility to be kept compact.

The results of measuring the loss of hydrogen gas after hydrogenation/dehydrogenation cycles of ten times, starting from the initial volume of 35 $Nm^3$ are reported for each of the metallic material W listed in the left column of Table 5. In the right column of Table 5 are shown comparative results of hydrogen loss incurred by using the conventional heat treating system.

As demonstrated in these results, there is little loss of hydrogen in the present embodiment, and the apparatus provides a significantly effective processing performance.

EXAMPLE 8

The metallic material W was prepared by using the same Ti-based alloys as in Example 5. This metallic material W was subjected to the same process of dehydrogenation as in Example 7. Coarse grained Ti alloys having α + β phase were produced. Such alloys are superior in creep and high cycle fatigue applications.

In this embodiment also, the hydrogen gas is contained between the storage device 12 and the furnace 11, and the emission of hydrogen to outside of the apparatus is prevented.

The results of measuring the loss of hydrogen gas after hydrogenation/dehydrogenation cycles of twenty times, starting from the initial volume of 35 $Nm^3$ are reported for each of the metallic material W listed in the left column of Table 6. In the right column of Table 6 are shown comparative results of hydrogen loss incurred by using the conventional heat treating system.

As demonstrated in these results, there is little loss of hydrogen in this embodiment, and a significantly effective performance is provided.

Figure 8:
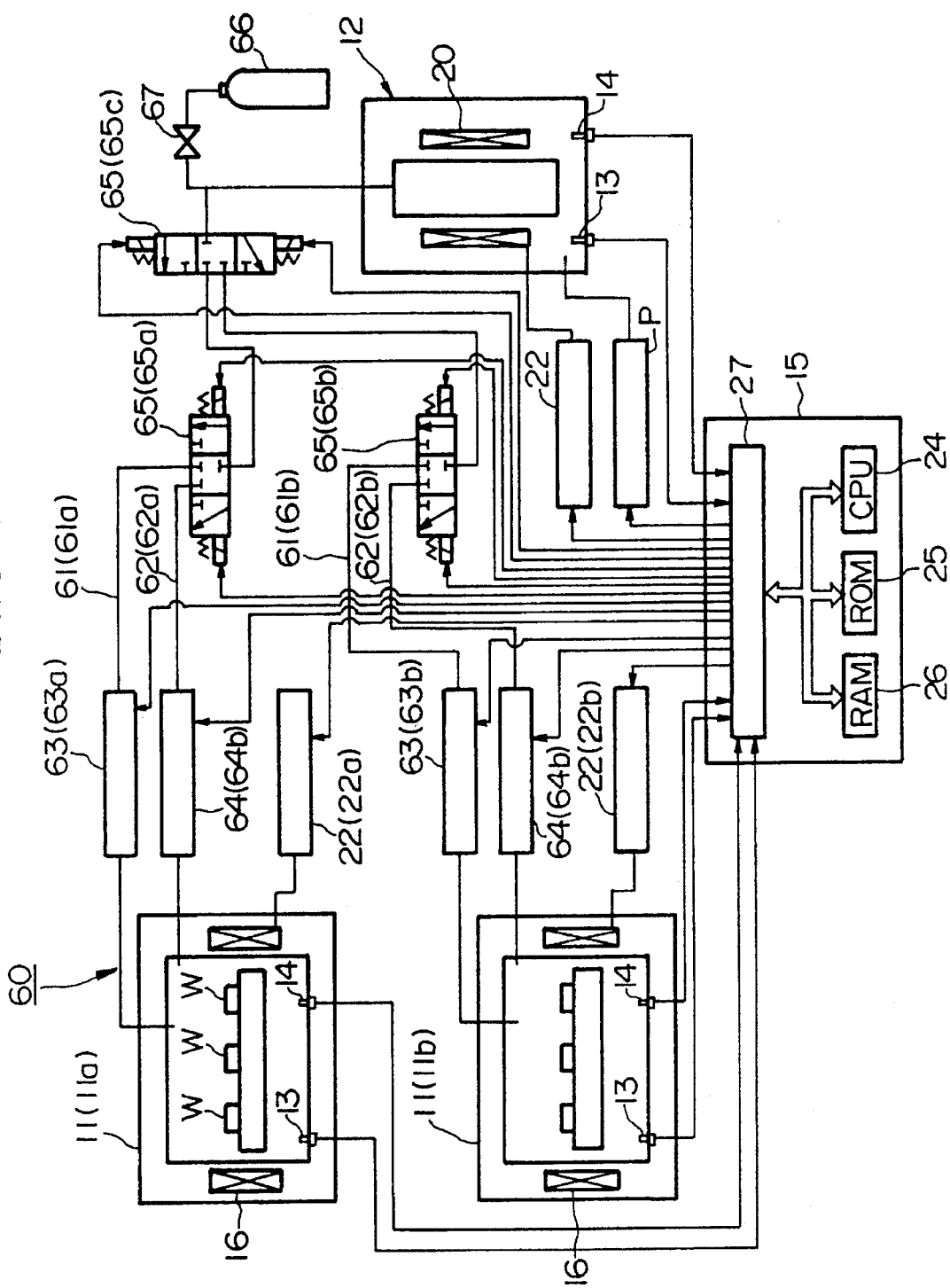
FIG. 8 is a schematic diagram for a fifth embodiment of the heat treating apparatus of the invention.

Next, a variation of the fifth embodiment of the present invention will be explained with reference to FIG. 8. In the following, the components which are the same as in the fourth embodiment were given the same reference numerals, and their explanations were omitted.

The apparatus 60 of the present embodiment comprises:

(a) a plurality of furnaces 11 (11a–11b) each of which performs the operation of hydrogenation and dehydrogenation of the metallic material W;

(b) the hydrogen storage device 12 containing the hydrogen absorbing alloy M for supplying hydrogen to the furnaces 11 (11a–11b);

(c) a plurality of exhaust paths 61 (61a–61b) for hydrogen gas for communicating the furnaces 11 (11a–11b) with the storage device 12, and for delivering the released hydrogen to the storage device 12;

(d) supply paths 62 (62a–62b) for supplying hydrogen gas from the storage device 12 to each of the furnaces 11 (11a–11b);

(e) evacuation means 63 (63a–63b) connected to the exhaust paths 61 (61a–61b) for evacuating the furnace atmosphere of the furnaces 11 (11a–11b) and delivering it to the storage device 12;

(f) pressure adjusting means 64 (pressure adjuster 64) connected to the supply paths 62 (62a–62b) for adjusting the pressure of the hydrogen supplied to the furnaces 11 (11a–11b);

(g) switching means 65 (routing valves 65) for selectively connecting one of the plurality of exhaust paths 61 (61a–61b) or supply paths 62 (62a–62b) to the storage device 12;

(f) the pressure sensors 13 and the temperature sensors 14 provided on each of the furnaces 11 (11a–11b) and the storage device 12 for measuring the internal pressures or temperatures therein;

(f) the master controller 15 which controls supply or release of hydrogen gas to and from the furnaces 11 (11a–11b), depending on the operational status of the furnaces 11 (11a–11b), by controlling the interior pressure and temperature of the furnaces 11 (11a–11b) and the storage device 12 together with the actions of the evacuation means 63, in accordance with the output signals from the sensors 13 and 14.

Each of the evacuation means 63 (63a–63b) is a vacuum pump, for example, and is provided with a flow valve at each end thereof, and one evacuation means is provided for each furnaces 11 (11a–11b) in this embodiment. The intake portion is attached to the furnaces 11 (11a–11b), and the exhaust portion is attached to the storage device 12 via the routing valves 65, and the exhaust path 61 is vacuum tight.

The pressure adjuster 64 (64a–64b) having flow valves and a pressure reducing valve is provided for each of the furnaces 11 (11a–11b). The flow valve normally closes the supply path 62, thereby shutting off the storage device 12 from the furnaces 11 (11a–11b), and when hydrogen gas is to be supplied to the furnaces 11 (11a–11b), the pressure of the hydrogen gas supplied to the furnaces 11 (11a–11b) is kept at below one atm by means of the pressure reducing valve. Moreover, the character P in FIG. 8 denotes an additional pressure control means provided to compensate the pressure in the hydrogen storage device 12.

Further, the evacuation means 63 and pressure adjuster 64 are not necessarily required for each of the furnaces 11, and they can be shared among the furnaces 11 be adding more routing valves 65.

The switching means 65 (routing valves 65).comprises evacuation means 63a (63b) which is provided for each of the furnaces 11 (11a–11b); routing valves 65a–65b connected to pressure adjusters 64a–64b); and a routing valve 65c which connects the attached routing valves 65a and 65b selectively to the storage device 12. Depending on a combination of the actions of the routing valves 65a, 65b and 65c, the following routing of the hydrogen can be made.

(i) storage means 12 → routing valve 65c → routing valve 65a → pressure adjuster 64a → furnace 11a;

(ii) furnace 11a → evacuation means 63a → routing valve 65a → routing valve 65c → storage device 12;

(iii) storage device 12 → routing valve 65c → routing valve 65b → pressure adjuster 64b → furnace 11b;

(iv) furnace 11b → evacuation means 63b → routing valve 65b → routing valve 65c → storage device 12.

Further, a hydrogen cylinder 66 is connected via flow valve 67 to the apparatus between the routing valve 65c and the storage device 12, and is used for filling the apparatus 60 with hydrogen during the initial stage of operation, or for supplementing the hydrogen lost due to leaks and the like.

The flow valve 67 is joined to the master controller 15 together with the evacuation means 63 and the pressure adjuster 64, and is controlled by the control signals generated by the master controller 15.

The metallic materials W treated in the apparatus 60 of this embodiment are the same as those used in previous embodiments.

When the apparatus 60 of this embodiment operates by heating the metallic material W placed in 11a, for example, the master controller 15 activates the temperature controller 24 to provide power to the heaters 16 and 20, and keeps the interior temperatures of the furnaces 11 and the storage device 12 at specific temperatures in accordance with the feedback data from the temperature sensor 14 attached thereto.

The routing valves 65a, 65b and 65c are thus controlled by the master controller 15, and a path for the hydrogen flow is established to keep the hydrogen flowing at a controlled pressure of less than one atm from the storage device 12 to the furnace 11a.

The hydrogenation of the metallic material W is thus carried out in the furnace 11a by the processing steps presented above.

After the above hydrogenation step is completed, the master controller 15 activates the routing valve 65a, close the flow valve on the pressure adjuster 64 and the evacuation means 63a is operated, thereby withdrawing and delivering the hydrogen from the furnace 11a to the storage device 12.

The interior pressure of the furnace 11a is thus reduced, and the interior pressure of the storage device 12 is increased, thereby creating the phenomenon of hydrogen release in the furnace 11 and absorption of hydrogen by the alloy M in the storage device The result is dehydrogenation of the metallic material W in the furnace 11a, and the hydrogen released from the metallic material W is recovered, through the exhaust path 61a, by the alloy M in the storage device 12.

The process steps described above are carried out alternately between the furnaces 11a and 11b, thus sharing the hydrogen stored in one storage device 12 between the furnaces 11a and 11b.

When it is necessary to make up the lost hydrogen gas caused by repeated cycles or opening of the system for inspection, the flow valve 67 is operated to admit hydrogen from hydrogen cylinders 66.

The thermal and pressure conditions utilized in the present embodiment are about the same as in the previous embodiment, and the heat treated metallic material W exhibited similar results.

In this embodiment also, the hydrogen gas is contained between the storage device 12 and the furnaces 11 (11a–11b), thus leading to low discharge of hydrogen to outside of the apparatus, and low consumption of hydrogen gas. The volume of gas sufficient for one furnace serves both furnaces 11 (11a–11b), thereby keeping the increase in the size of the facility to a minimum.

Furthermore in this embodiment, because the apparatus 60 is arranged so that the hydrogen inside the furnaces 11 (11a–11b) is delivered directly to the storage device 12, the steps of reducing the interior pressure of the furnaces 11 (11a–11b), pressurization of the storage device 12 and delivering of hydrogen to the storage device 12 are carried out simultaneously, thus simplifying the operational system.

Further, by providing a pressure adjuster 64 in the supply path 62, it becomes possible to precisely control the pressure of the hydrogen gas delivered from the storage device 12 to the furnace 11, thus leading to a stable process of heat treatment.

In the present embodiment, pressurization of the storage device 12 is carried out by the evacuation means 63, but it is also possible to provide a pressure means between the evacuation means 63 and the storage device 12, and thereby increase the pressure inside the storage device 12 even higher. This approach is effective when it is desired to increase the volume of hydrogen gas contained inside the storage device 12.

Also in the present embodiment, two furnaces 11 are provided, but more than three furnaces 11 can be added provided that the cycling times for the processing steps do no overlap.

Figure 9:
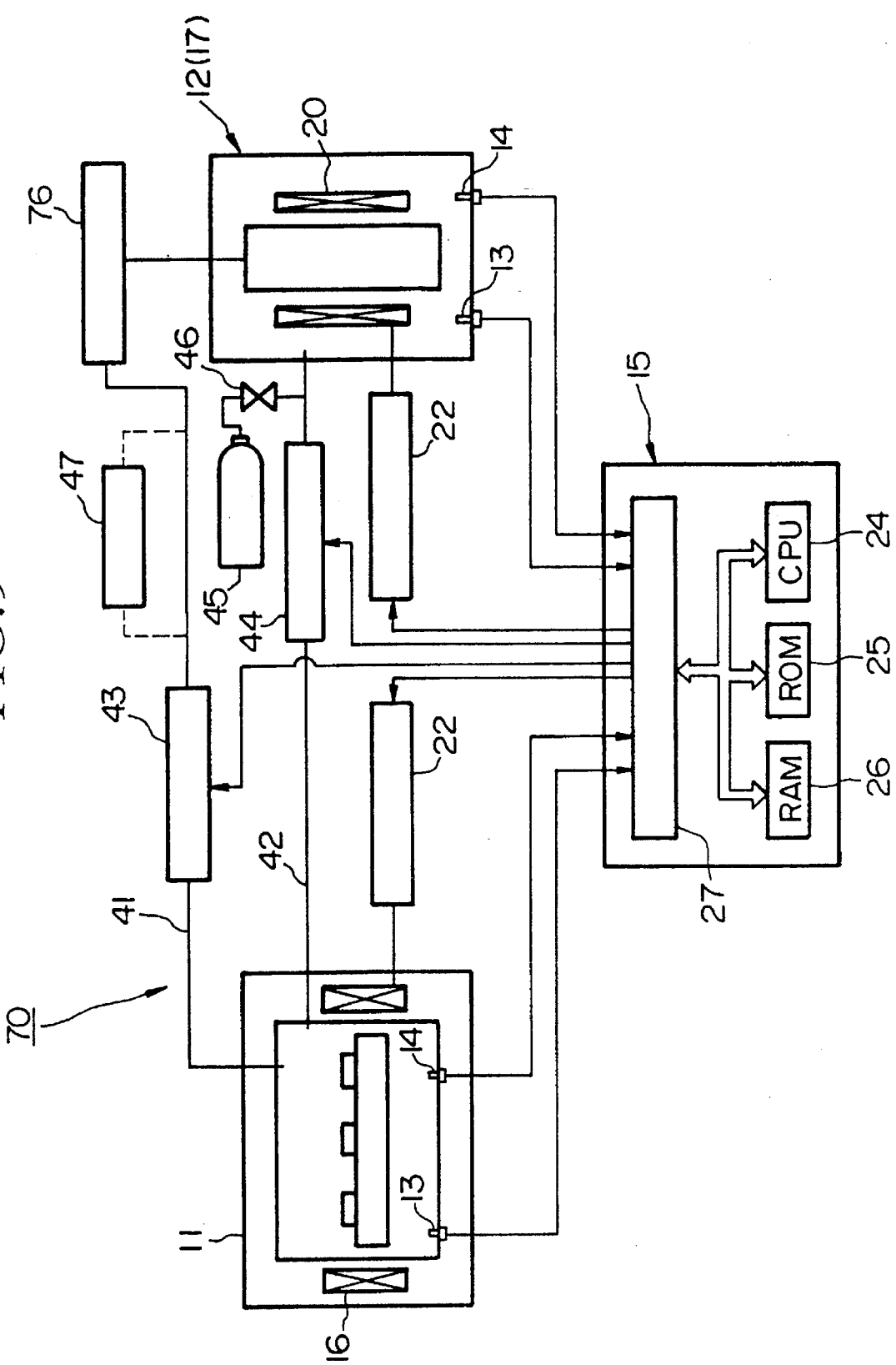
FIG. 9 is a schematic diagram for a sixth embodiment of the heat treating apparatus of the invention.

FIG. 9 is a schematic view of a heat treating apparatus 70 in accordance with a sixth embodiment of the present invention. The only difference between the sixth embodiment and the third embodiment shown in FIG. 6 is that a hydrogen filter or refiner 76 for the hydrogen gas flowing in the exhaust path 41 is provided on the exhaust side of the evacuation means 43 in the exhaust path 41. Therefore, the same components as in FIG. 6 are given the same reference numerals, and their detailed explanation are omitted.

The operational characteristics of the apparatus 70 are roughly the same as those of the third embodiment, excepting that the hydrogen gas exhausted from the furnace 11, by the action of the evacuation means 43, is delivered to the container 17 of the storage device 12 after passing through the hydrogen refiner 76. By this step, impurities contained in the hydrogen gas and the furnace atmosphere including hydrogen are removed in the hydrogen refiner 76. According to the sixth embodiment, because the hydrogen gas is purified in the step of recovering by the storage device, the degrading effects caused by using recycled hydrogen on the metallic material W are prevented.

Figure 10:
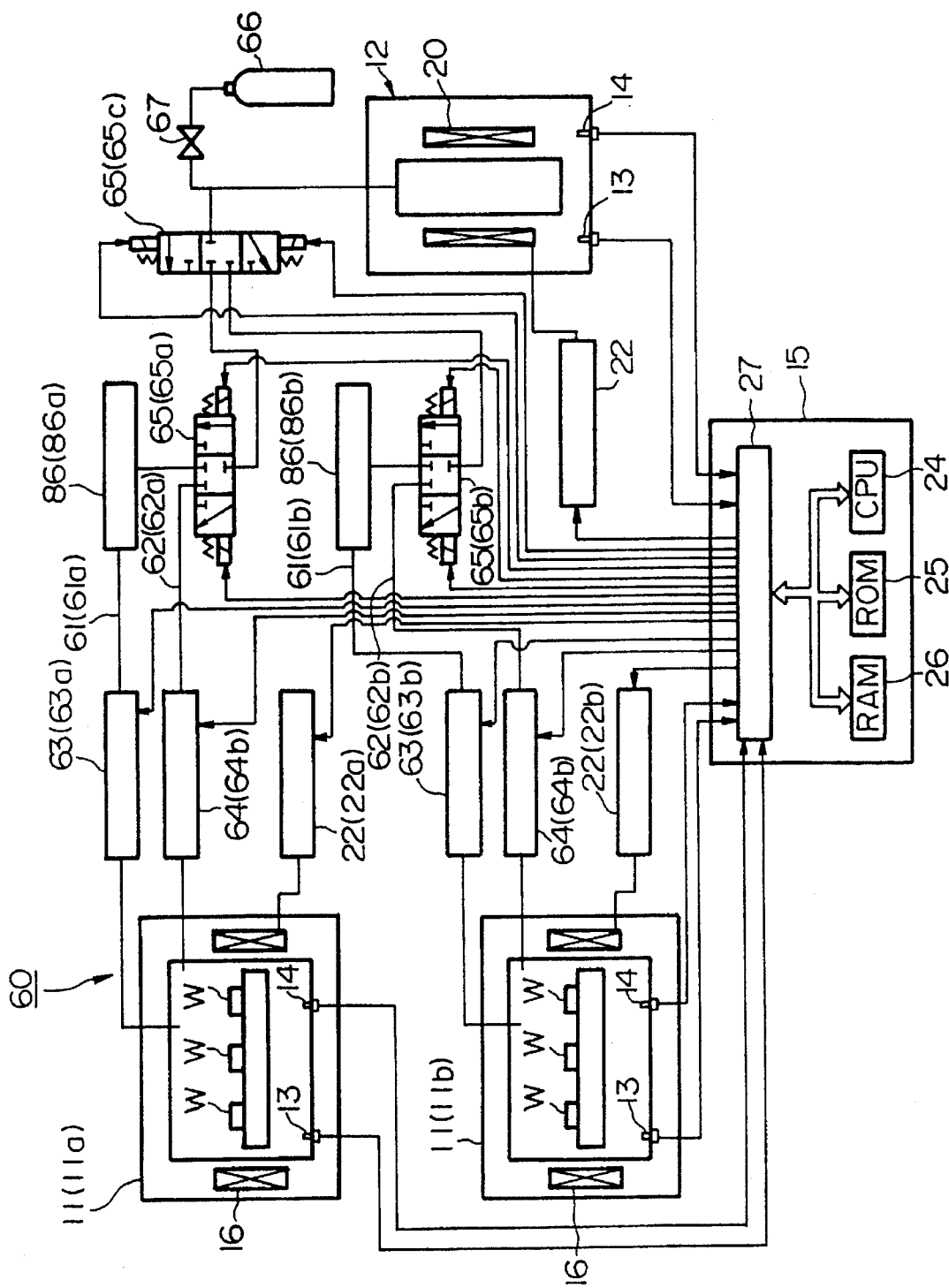
FIG. 10 is a schematic diagram for a seventh embodiment of the heat treating apparatus in accordance with a variation of the fifth embodiment shown in FIG. 8.

FIG. 10 shows a heat treating apparatus 80 of a seventh embodiment. The only difference between the seventh embodiment and the fifth embodiment shown in FIG. 8 is that hydrogen refiners 86 (86a–86b) for the hydrogen gas flowing in the exhaust path 61 is provided on the exhaust side of the evacuation means 63 of the exhaust path 61 (61a–61b). Therefore, the components are referred to by the same reference numerals, and their detailed explanations are omitted. In this apparatus, the hydrogen gas released from the furnace 11, resulting from the action of the evacuation means 63, is delivered to the container 17 of the storage device 12 after passing through the hydrogen refiners 86, as in the previous embodiment, and impurities contained in the hydrogen gas or in the furnace atmosphere are removed.

Figure 11:
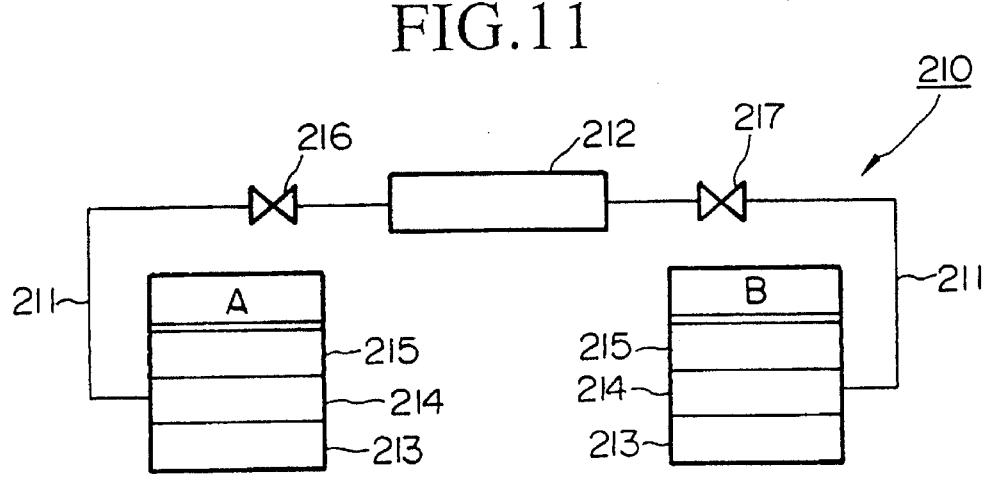
FIG. 11 is a schematic diagram for showing the heat treatment system for an eighth embodiment of the invention.

FIG. 11 is a schematic diagram of an eighth embodiment, and shows a case of utilizing a heat treating furnace as a hydrogen recovering means. The primary components of the heat treating apparatus 210 of the eighth embodiment comprise: a plurality of heat treating furnaces A and B for hydrogenation/dehydrogenation of the metallic material W (two are shown in this embodiment); connecting path 211 for communicating the heat treating furnaces A and B with each other by forming a hydrogen path therebetween; and a pressure controller 212, disposed in the connecting path 211, for supplying and pressurizing hydrogen to the furnace A (B) when it is performing the hydrogenation step, and for reducing the interior pressure and exhausting hydrogen gas from the furnace A (B) when it is performing the dehydrogenation step.

Each of the heat treating furnaces A and B comprises: a preheating chamber 213 for heating the metallic material W prior to processing heat treatments; a processing chamber 214 communicating with the preheating chamber 213 for performing hydrogenation/dehydrogenation processes for the metallic material W; a cooling chamber communicating with the processing chamber 214 for cooling the metallic material W forwarded from the processing chamber 214. The preheating chambers 213, the processing chambers 214 and the cooling chambers 215 are disposed so that they can communicate with each other or can be isolated from each other. Suitable heat treating furnaces A and B are those vacuum furnaces having internal heating means made of graphite, tungsten or molybdenum, or those having external heating means made of Kanthal alloy or high-purity silicon carbide.

The connecting path 211 having the pressure controller 212 is disposed so as to communicate the processing chambers 214 of the heat treating furnaces A and B with each other, and it is made gas tight so as to isolate the hydrogen gas flowing therein from the outside atmosphere.

The pressure controller 212 is constructed so that its volume can be varied without exchanging the gas therein with the external atmosphere. For example, a fluid operated cylinder is suitable. By connecting the pressure controller 212 with one of the processing chambers 214 selectively, according to the action of the flow valves 216 and 217 provided on each end of the pressure controller 212, the volume of the connected processing chamber 214 can either be increased thereby lowering the pressure in the processing chamber 214 to release and receive the hydrogen therefrom; or the volume can be decreased thereby increasing the pressure therein to deliver the hydrogen gas therefrom.

The control of the interior temperature and pressure of the processing chambers and the actions of the pressure controller 212 and the flow valves 216,217 is provided by microcomputers so as to maintain specified operating conditions.

Two examples for processing the metallic materials W in the above apparatus 210 described will be presented in the following.

EXAMPLE 9

As the metallic materials W to be processed, R-Fe-B based alloys shown in Tables 1, Cases 1–4, were used to prepare the same test materials as in Example 1.

The metallic material W thus prepared is first processed in the evacuated preheating chamber 213 of the furnace A having external Kanthal heaters, and then placed in the evacuated processing chamber 214. After isolating the preheating chamber 213 and the processing chamber 214, heating of the processing chamber 214 is commenced.

The interior temperature of the processing chamber 214 is measured by each temperature sensor and supplied to the microcomputer controlling means, and in accordance with the feedback signal, the interior temperature of the processing chamber 214 is kept at a constant temperature (about 300° C.).

In the initial stage of the operation, a separate hydrogen storage means (not shown) is used to deliver a specified amount of hydrogen at a specified pressure (below about one atm) into the processing chamber 214 of the furnace A. The interior pressure of the processing chamber 214 of the furnace A is measured by the pressure sensor, fed back to the master controller which maintains the pressure as described above.

After the supplying of hydrogen is thus completed, the temperature of the furnace A is raised to about 830° C., and the metallic material W is held at this temperature for about three hours, thereby completing the hydrogenation process.

Next, while holding the interior temperature of the furnace A at 830° C., the master controller 15 activates one of the flow valves 216, thereby communicating the pressure controller 212 with the other processing chamber 214 of the furnace B, and also activates the pressure controller 212 thereby withdrawing the atmosphere from the furnace A.

By this step, the interior pressure of the furnace A is reduced and by withdrawing the atmosphere therein by means of the pressure controller 212, the hydrogen absorbed in the metallic material W is released, and after the dehydrogenation step is completed, the flow valve 216 is closed, thereby disconnecting the processing chamber 214 of the furnace A from the pressure controller 212.

At this stage, the interior pressure of the furnace A is maintained at below $1 \times 10^{-1}$ torr by the action of the pressure controller 212 regulated by the master controller 15 based on the pressure sensor signal.

It was confirmed that the Nd-Fe-B based alloys after the above treatment were pulverized to below 400 μm containing recrystallized grains of $Nd_2Fe_{14}B$ of 0.2 to 0.4 μm size, and exhibited the desired magnetic properties.

In parallel with dehydrogenation process of the metallic material W in the furnace A, a new batch of the metallic material W is placed in the processing chamber 214, and readied for the hydrogenation step by heating the chamber 214 to a specified temperature.

After the above step, the other flow valve 217 is opened by the master controller 15 activating the pressure controller 212, thereby forwarding the hydrogen gas withdrawn by the pressure controller 212 to the processing chamber 214 of the other furnace B to carry out the hydrogenation step. When the hydrogenation step is completed, the pressure controller 212 operates in reverse, thereby withdrawing the hydrogen in the other furnace B to carry out the dehydrogenation step.

After the heat treating of the metallic material W is completed in the furnace B, the other flow valve 217 is closed, thereby disconnecting the furnace B from the pressure controller 212, thus completing the heat treating process for the metallic material W.

As presented above, the apparatus 210 of the present embodiment contains the hydrogen gas between the furnaces A and B via the pressure controller 212 thus controlling the amount of loss of hydrogen gas to outside of the system, thereby reducing the consumption of the hydrogen gas significantly as well as eliminating the need for large capital investment and a large scale facility, by eliminating the exhaust gas treatment units. Further, the fact that two furnaces A and B are operated with the initial charge of hydrogen gas sufficient for one furnace is also useful in limiting the facility size increase.

With respect to the make-up hydrogen, it should be noted that although charging/discharging of the metallic material W from the furnaces, as well as repeated processing contribute to some loss of hydrogen, the amount of loss is quite small. Even if the accumulating loss leads to an insufficient gas inside the apparatus, it is only necessary to replenish the lost amount which can be supplied from a small gas storage unit.

At this time, the results of measuring the loss of hydrogen gas after hydrogenation/dehydrogenation cycles of ten times, starting from the initial volume of 35 $Nm^3$, were similar to the results obtained in Example 4. These results demonstrate clearly that the present experimental example produces little loss of hydrogen and highly effective performance.

EXAMPLE 10

As the metallic material W to be processed, same Ti-based alloys as those in Experiment 5 were used. Such metallic materials W were placed in the furnace A (B) of the apparatus 210, provided with an internal graphite heater. By operating the various controls by means of the master controller as in the previous example, hydrogenation process was carried out at 850° C. and at one atmosphere, while the dehydrogenation process was carried out at 850° C. and at $1\times10^{-4}$ torr.

By such a heat treating process, it was possible to obtain Ti alloys having coarse grains of ($\alpha + \beta$) phase. Such materials exhibit good resistance to creep and high cycle fatigue.

In this example also, the hydrogen is contained between the furnaces A and B via the pressure controller 212, and there is little loss of hydrogen to outside of the apparatus.

The results of measuring the loss of hydrogen gas after hydrogenation/dehydrogenation cycles of twenty times, starting from the initial volume of 35 $Nm^3$, were similar to the results obtained in Example 5. These results demonstrate clearly that the present example produces little loss of hydrogen and provides highly effective performance.

Figure 12:
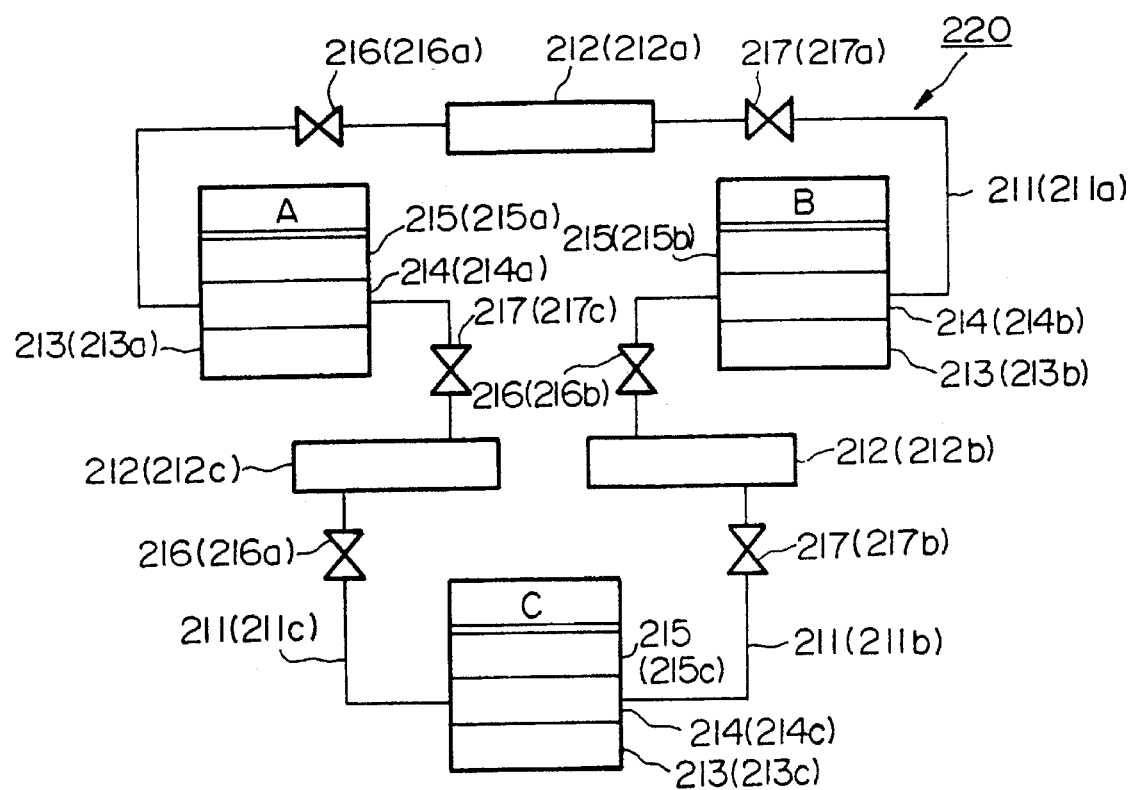
FIG. 12 is a schematic diagram for a ninth embodiment of the heat treating apparatus of the invention.

FIG. 12 is a schematic diagram showing an apparatus 220 in accordance with a ninth embodiment of the present invention, in which in addition to the furnaces A and B utilized in the previous eighth embodiment, another furnace C is added.

In the ninth embodiment, the processing chambers 214 of the furnaces A, B and C are communicated in line with a plurality of routing paths 211 (211a–211b–211C), the pressure controllers 212 (212a–212b–212c) in the routing paths 211a–211b–211C and a pair of flow valves 216 (216a–216b–216c) and 217 (217a–217b–217c).

The apparatus 220 is operated by successively regulating the actions of the pressure controllers 212 (212a–212b–212c), and a pair of flow valves 216 (216a–216b–216c) and 217 (217a–217b–217c) to forward the hydrogen gas from furnace A to furnace B, hence to furnace C, thereby performing hydrogenation and dehydrogenation operations in the furnaces A, B and C successively on the metallic material W.

In the apparatus 220 of the tenth embodiment, the processing hydrogen gas is contained within the furnaces A, B and C, and little hydrogen escapes to the outside of the system. Therefore, the hydrogen gas is conserved, and it becomes possible to operate three furnaces with the volume of hydrogen gas required for one furnace, provided that the overlapping of process cycles between the furnaces is avoided, enabling to make the apparatus more compact than the case of operating the furnaces independently in a parallel arrangement.

Figure 13:
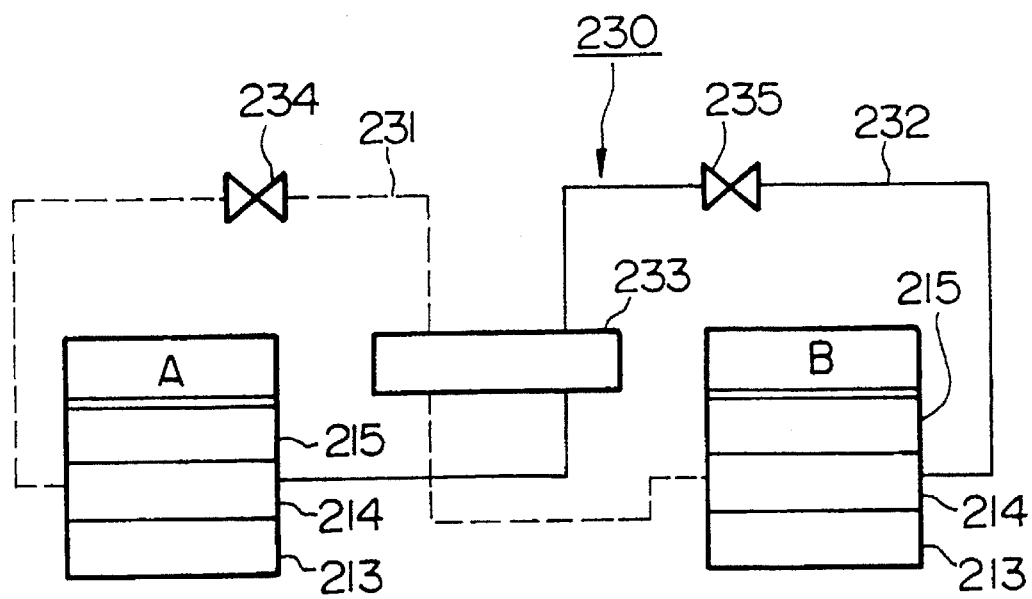
FIG. 13 is a schematic diagram for a variation of a tenth embodiment of the heat treating apparatus of the invention.

FIG. 13 is a schematic diagram of an apparatus 230 in accordance with a tenth embodiment of the present invention, which comprises: processing chambers 214 of the furnaces A and B connected by respective connecting paths 231 and 232 of the two groups A and B; evacuation means 233 acting as the pressure controller 212, similar to the one shown in the first embodiment, shared between the respective connecting paths 231 and 232; flow valves 234 and 235 disposed on the suction side and the exhaust side, respectively, of the evacuation means 233 in the connecting paths 231 and 232.

The apparatus 230 is operated in a similar way as in the case of the eighth embodiment, except that the method of circulating the hydrogen gas is different.

For example, when the hydrogenation process in the furnace A is completed, of the two flow valves in the open condition, the flow valve 234 disposed between the evacuation means 233 and the furnace A is opened and simultaneously the atmosphere in the furnace A is withdrawn and is forwarded to the furnace B by means of the evacuation means 233.

The above step reduces the interior pressure of the processing chamber 214 of the furnace A leading to the release of hydrogen therein, and this released hydrogen is delivered to the furnace B by means of the evacuation means 233, resulting in a rise in the interior pressure of the processing chamber 214 of the furnace B, enabling hydrogenation to take place in the furnace B.

The hydrogen pressure of the hydrogen delivered to the furnace B is controlled by regulating the action volume of the evacuation means 233 according to the feedback signal for the interior pressure of the processing chamber 214 of the furnace B from the pressure sensor.

Next, by closing the flow valve 234 which has been kept in the open state, the furnace B is maintained in the closed state. After allowing the hydrogenation to complete, the other flow valve 235 is opened, and by simultaneously operating the evacuation means 233, the hydrogen in the processing chamber 214 of the furnace B is withdrawn, and is delivered to the processing chamber 214 of the furnace A. The above described process is repeated, thus carrying out dehydrogenation in the furnace B while carrying out hydrogenation in furnace A.

By repeating the above cycles, heat treating of the metallic material W is carried out in the furnaces A and B alternately. In this embodiment also, as in the case of the first embodiment, the apparatus provides features that the hydrogen gas is contained within the two furnace systems allowing little hydrogen to be released to outside of the apparatus 230 thus conserving hydrogen; the volume of hydrogen sufficient for one furnace is shared between the two furnaces; and only a small volume of reserve hydrogen is needed thus keeping the size of the processing facility small.

Further in this embodiment, when the furnace A is in the hydrogen releasing status, the hydrogen is forcibly removed from furnace A, and is delivered to furnace B to raise the interior pressure. This arrangement enables the apparatus to perform, at the same time, the steps of pressure decrease in furnace A, pressure increase in furnace B and the transfer of hydrogen. This procedure promotes speedy and accurate processing of the metallic material W.

Figure 14:
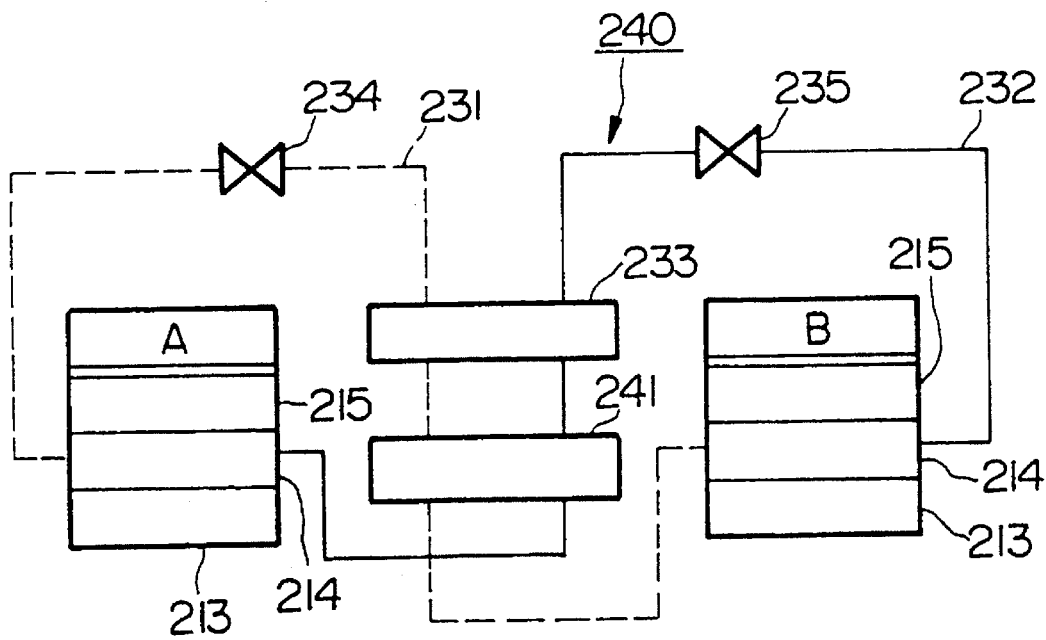
FIG. 14 is a schematic diagram for an eleventh embodiment of the heat treating apparatus of the invention.

Further, FIG. 14 is a schematic diagram of an eleventh embodiment of the present invention. The apparatus 240 of the eleventh embodiment is similar to the tenth embodiment except for the replacing of the pressure controller 212 used as the evacuation means 233 in the embodiment 10, with an evacuation means 233 and a pressure adjuster 241 disposed on the exhaust side thereof.

The operation of the apparatus of the eleventh embodiment is similar to that of the tenth embodiment, except that in the tenth embodiment, the hydrogen supply pressure was regulated by controlling the amount of acting volume of the evacuation means 233 (i.e. the interior pressure of the processing chamber 214 in the hydrogen release condition). In contrast, the feature of the present embodiment is that this function is provided by the pressure adjustment means 241.

By adopting such an arrangement of the apparatus, it becomes possible to finely adjust the hydrogen supply pressure with high precision, and by providing independent functions for the supply pressure adjustment and for the pressure reduction of the furnace in the hydrogen release condition, the stability of the heat treating process is further enhanced.

Figure 15:
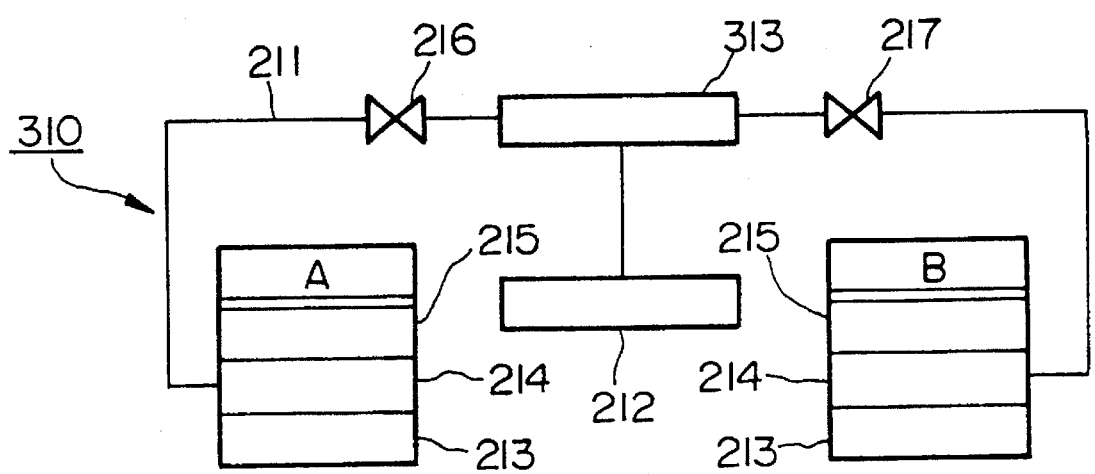
FIG. 15 is a schematic diagram for a twelfth embodiment of the heat treating apparatus based on a variation of the eighth embodiment shown in FIG. 11.
Figure 16:
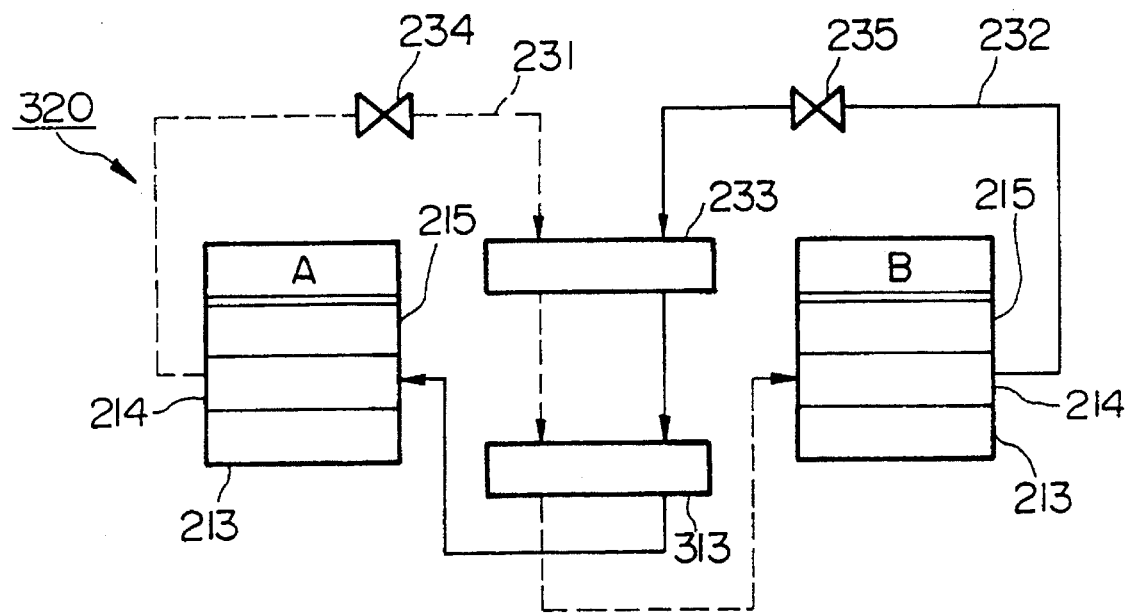
FIG. 16 is a schematic diagram for a thirteenth embodiment of the heat treating apparatus based on a variation of the tenth embodiment shown in FIG. 11.
Figure 17:
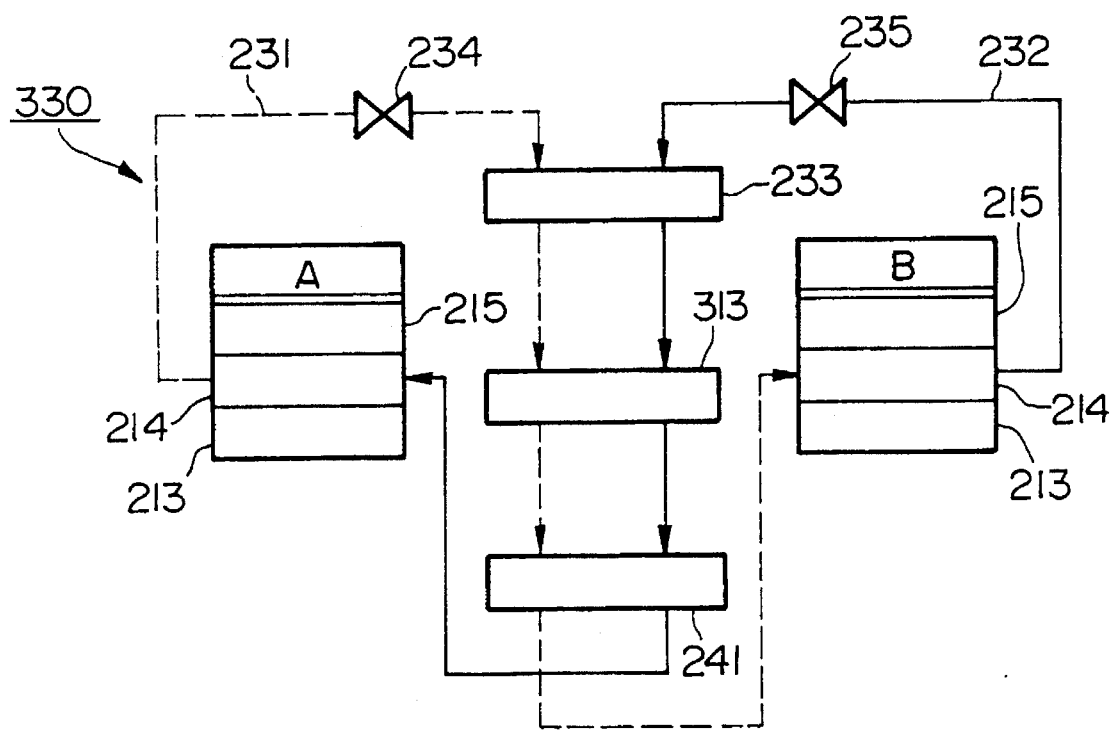
FIG. 17 is a schematic diagram for a fourteenth embodiment of the heat treating apparatus based on a variation of the eleventh embodiment shown in FIG. 14.

Next, FIG. 15 is a schematic diagram of an apparatus 310 of a twelfth embodiment of the present invention. The only difference between this embodiment and the eighth embodiment shown in FIG. 11 is a provision of a hydrogen refiner 313 in the connecting path 211. FIG. 16 is a schematic diagram of an apparatus 313 of a thirteenth embodiment, and compared with the tenth embodiment, a difference is the provision of a hydrogen refiner 313 in the connecting path 231. FIG. 17 is a schematic diagram of an apparatus 330 of a fourteenth embodiment, which is the same embodiment as the eleventh embodiment with an addition of a hydrogen refiner 313. The function of the hydrogen refiner in these embodiments is the same as that in the sixth and seventh embodiments, and the explanations are omitted.

TABLE 1

| (Composition in atomic %) | | | | |
|---|---|---|---|---|
| | Case 1 | Case 2 | Case 3 | Case 4 |
| Nd | 13.5 | 15.0 | 12.5 | 12.0 |
| Co | 11.6 | 17.5 | 17.5 | 11.6 |
| B | 6.0 | 7.0 | 6.5 | 6.0 |
| Si | 0.4 | — | — | — |
| Al | — | 0.5 | — | — |
| Zr | — | — | 0.1 | — |
| Ga | — | — | 0.5 | 1.0 |
| Fe | Remainder | Remainder | Remainder | Remainder |

TABLE 2

| (in Nm³) | | | | |
|---|---|---|---|---|
| | Embodiment | | Comparison | |
| | Before | After | Before | After |
| 1 | 35.0 | 34.9 | 35.0 | 27.4 |
| 2 | 35.0 | 34.9 | 35.0 | 26.3 |
| 3 | 35.0 | 35.0 | 35.0 | 28.5 |
| 4 | 35.0 | 35.0 | 35.0 | 29.1 |

TABLE 3

| (in weight %) | | | | | | | | |
|---|---|---|---|---|---|---|---|---|
| | Al | V | Sn | Zr | Mo | Cr | Fe | Ti |
| 1 | 6.5 | 1.3 | 1.0 | 1.0 | 2.6 | 2.1 | 1.6 | Rem |
| 2 | 6.0 | 4.0 | — | — | — | — | — | Rem |

Rem: Remainder

TABLE 4

| (in Nm³) | | | | |
|---|---|---|---|---|
| | Embodiment | | Comparison | |
| | Before | After | Before | After |
| 1 | 35.0 | 35.0 | 35.0 | 28.4 |
| 2 | 35.0 | 35.0 | 35.0 | 26.6 |

TABLE 5

| (in Nm³) | | | | |
|---|---|---|---|---|
| | Embodiment | | Comparison | |
| | Before | After | Before | After |
| 1 | 35.0 | 35.0 | 35.0 | 27.4 |
| 2 | 35.0 | 34.9 | 35.0 | 26.3 |
| 3 | 35.0 | 35.0 | 35.0 | 28.5 |
| 4 | 35.0 | 35.0 | 35.0 | 29.1 |

TABLE 6

| (in Nm³) | | | | |
|---|---|---|---|---|
| | Embodiment | | Comparison | |
| | Before | After | Before | After |
| 1 | 35.0 | 35.0 | 35.0 | 28.4 |
| 2 | 35.0 | 34.9 | 35.0 | 26.6 |

What is claimed is:

1. A method for heat treating a metallic material the method comprising the steps of:

placing a metallic material in a furnace;

charging hydrogen into said furnace from a hydrogen storage device which includes a hydrogen absorbing alloy so as to cause a hydrogenation or absorbing of hydrogen in said metallic material; and releasing the hydrogen absorbed in said metallic material from said furnace to cause a dehydrogenation of the metallic material and thereby alter a microstructure of the metallic material wherein the hydrogen released from said furnace is charged into said storage device and absorbed into the hydrogen absorbing alloy such that the hydrogen absorbed in said hydrogen absorbing alloy is repeatedly charged, transported and confined between the storage device and the furnace.

2. A method according to claim 1, comprising the further steps of:

controlling a pressure within said furnace and said storage device by providing said furnace and said storage device with pressure control means;

controlling a temperature within said furnace and said storage device by providing each of said furnace and said storage device with temperature control means;

measuring a temperature and pressure in each of said furnace and said storage device by providing temperature and pressure sensors in each of said furnace and said storage device, said temperature and pressure sensors sending signals to a controller, said controller being operationally connected to at least said pressure control means and said temperature control means; and controlling a pressure and temperature of each of said furnace and said storage device during the steps of said method through said controller based on at least the signals from said temperature and pressure sensors.

3. A method according to claim 1, wherein the metallic material is a material selected from the group consisting of a rare earth magnet material, Ti based alloys, and a hydrogen absorbing alloy.

4. A method for heat treating metallic materials the method comprising the steps of:

placing a first metallic material in a first furnace;

placing a second metallic material in a second furnace;

causing hydrogen to be released from said second furnace to effect a dehydrogenation of the second metallic material and supplying the hydrogen released from said second furnace into said first furnace to cause a hydrogenation of absorbing the hydrogen in said first metallic material, wherein the release of hydrogen from the second furnace alters a microstructure of the second metallic material, causing hydrogen to be released from said first furnace to effect a dehydrogenation of the first metallic material and supplying the hydrogen released from said first furnace into said second furnace to cause a hydrogenation or absorbing of the hydrogen in said second metallic material, wherein the release of hydrogen from the first furnace alters a microstructure of the first metallic material; and wherein the hydrogen is repeatedly charged and transported between said first furnace and said second furnace.

5. A method according to claim 4, comprising the further steps of:

controlling a pressure within said first and second furnaces and said storage device by providing said first and second furnaces and said storage device with pressure control means;

controlling a temperature within said first and second furnaces and said storage device by providing each of said first and second furnaces and said storage device with temperature control means;

measuring a temperature and pressure in each of said first and second furnaces and said storage device by providing temperature and pressure sensors in each of said first and second furnaces and said storage devices, said temperature and pressure sensors sending signals to a controller, said controller being operationally connected to at least said pressure control means and said temperature control means; and controlling a pressure and temperature of each of said first and second furnaces and said storage device during the steps of said method through said controller based on at least the signals from said temperature and pressure sensors.

6. A method according to claim 4, wherein the first and second metallic materials are selected from the group consisting of a rare earth magnet material, Ti based alloys, and a hydrogen absorbing alloy.

* * * * *